US012159584B2

(12) United States Patent
Kim et al.

(10) Patent No.: US 12,159,584 B2
(45) **Date of Patent: *Dec. 3, 2024**

(54) DISPLAY DEVICE

(71) Applicant: SAMSUNG DISPLAY CO., LTD., Yongin-si (KR)

(72) Inventors: Mi Hae Kim, Yongin-si (KR); Min Kyu Woo, Yongin-si (KR); Young Taeg Jung, Yongin-si (KR); Hyun Chol Bang, Yongin-si (KR); Sang Won Seok, Yongin-si (KR); Hwan Soo Jang, Yongin-si (KR); Ju Hee Hyeon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/447,691

(22) Filed: Aug. 10, 2023

(65) Prior Publication Data

US 2023/0402009 A1 Dec. 14, 2023

Related U.S. Application Data

(63) Continuation of application No. 17/590,490, filed on Feb. 1, 2022, now Pat. No. 11,727,876, which is a (Continued)

(30) Foreign Application Priority Data

Dec. 22, 2017 (KR) ........................ 10-2017-0178356

(51) Int. Cl.

*G09G 3/3233* (2016.01)
*G09G 3/3266* (2016.01)

(52) U.S. Cl.

CPC ......... *G09G 3/3233* (2013.01); *G09G 3/3266* (2013.01); *G09G 2300/0426* (2013.01);

(Continued)

(58) Field of Classification Search

CPC ............... G09G 3/3233; G09G 3/3266; G09G 2300/0439

See application file for complete search history.

(56) References Cited

U.S. PATENT DOCUMENTS 8,427,596 B2 4/2013 Ma
8,570,416 B2 10/2013 Araki et al.

(Continued)

FOREIGN PATENT DOCUMENTS

CN 101762915 6/2010
CN 103297715 9/2013

(Continued)

OTHER PUBLICATIONS

Chinese Patent Office dated Aug. 24, 2022 corresponding to the Chinese Patent Application No. 201811323874.5 filed on Nov. 8, 2018.

(Continued)

*Primary Examiner* — Lisa S Landis
(74) *Attorney, Agent, or Firm* — F. Chau & Associates, LLC

(57) ABSTRACT

A display device includes a first pixel region including a plurality of first pixels and a plurality of first gate control lines coupled to the first pixels, and a second pixel region spaced apart from the first pixel region. The second pixel region includes a plurality of second pixels and a plurality of second gate control lines coupled to the second pixels. The display device further includes a first non-pixel region disposed between the first pixel region and the second pixel region, and a first coupling line disposed in the first non- (Continued)

pixel region. The first coupling line commonly couples at least two first gate control lines and at least two second gate control lines.

24 Claims, 26 Drawing Sheets

Related U.S. Application Data continuation of application No. 17/020,046, filed on Sep. 14, 2020, now Pat. No. 11,250,776, which is a continuation of application No. 16/152,597, filed on Oct. 5, 2018, now Pat. No. 10,796,636.

(52) U.S. Cl.
CPC ............... *G09G 2300/0439* (2013.01); *G09G 2310/0221* (2013.01); *G09G 2320/0223* (2013.01); *G09G 2320/0233* (2013.01)

(56) References Cited

U.S. PATENT DOCUMENTS

| | | | |
|---|---|---|---|
| 9,564,091 B2 | 2/2017 | Kim | |
| 9,685,131 B2 | 6/2017 | Tanaka et al. | |
| 9,940,888 B2 | 4/2018 | Ryoo et al. | |
| 10,388,228 B2 | 8/2019 | Kim et al. | |
| 10,431,162 B2 | 10/2019 | Kim et al. | |
| 10,796,636 B2 | 10/2020 | Kim et al. | |
| 11,250,776 B2 | 2/2022 | Kim et al. | |
| 2008/0043005 A1 | 2/2008 | Kanda | |
| 2014/0225818 A1 | 8/2014 | Kim | |
| 2016/0019856 A1 | 1/2016 | Tanaka et al. | |
| 2017/0084234 A1 | 3/2017 | Shin et al. | |
| 2018/0129111 A1 | 5/2018 | Wu et al. | |
| 2018/0204889 A1* | 7/2018 | Yu | H10K 59/88 |
| 2019/0197949 A1 | 6/2019 | Kim et al. | |
| 2020/0327848 A1 | 10/2020 | Ka et al. | |
| 2020/0410935 A1 | 12/2020 | Kim et al. | |
| 2022/0157242 A1 | 5/2022 | Kim et al. | |

FOREIGN PATENT DOCUMENTS

| | | |
|---|---|---|
| CN | 105164743 | 12/2015 |
| CN | 105575330 | 5/2016 |
| KR | 10-2017-0064598 | 6/2017 |
| KR | 10-2017-0102146 | 9/2017 |
| KR | 10-2017-0119270 | 10/2017 |
| KR | 10-2017-0130661 | 11/2017 |
| KR | 10-2017-0131758 | 11/2017 |
| WO | 2017172375 | 10/2017 |

OTHER PUBLICATIONS

Extended European Search Report issued from the European Patent Office on Feb. 5, 2019 corresponding to European Patent Application No. 18199765.1 filed on Oct. 11, 2018.

Final Office Action dated Mar. 27, 2020 in corresponding U.S. Appl. No. 16/152,597.

Non-Final Office Action dated Oct. 16, 2019 in corresponding U.S. Appl. No. 16/152,597.

Notice of Allowance dated Jun. 24, 2021 in corresponding U.S. Appl. No. 17/020,046.

Notice of Allowance dated Oct. 15, 2021 in corresponding U.S. Appl. No. 17/020,046.

Notice of Allowance issued from the Korean Intellectual Property Office on Sep. 29, 2021 in the corresponding Korean Patent Application No. 10-2017-0178356 filed on Dec. 22, 2017.

Partial European Search Report issued from the European Patent Office on Nov. 29, 2018 corresponding to European Patent Application No. 18199765.1 filed on Oct. 11, 2018.

Office Action dated Sep. 23, 2023 in corresponding U.S. Appl. No. 17/590,490.

* cited by examiner

DISPLAY DEVICE

CROSS-REFERENCE TO RELATED APPLICATIONS

This application is a continuation application of U.S. patent application Ser. No. 17/590,490 filed Feb. 1, 2022, which is a continuation application of U.S. patent application Ser. No. 17/020,046 filed Sep. 14, 2020, issued as U.S. Pat. No. 11,250,776 on Feb. 15, 2022, which is a continuation application of U.S. patent application Ser. No. 16/152,597 filed Oct. 5, 2018, issued as U.S. Pat. No. 10,796,636 on Oct. 6, 2020, which claims priority under 35 U.S.C. § 119 to Korean Patent Application No. 10-2017-0178356 filed on Dec. 22, 2017, the disclosures of which are incorporated by reference herein in their entirety.

TECHNICAL FIELD

Exemplary embodiments of the present disclosure relate to a display device.

RELATED ART

A display device may include a plurality of pixel regions spaced apart from one another, or may have a display region in which one portion is partially concavely recessed, in addition to typical shapes such as a single quadrangular shape.

SUMMARY

Exemplary embodiments of the present disclosure provide a display device that includes first and second pixel regions spaced apart from each other with at least one non-pixel region interposed therebetween. Such a display device reduces the area of a non-pixel region included in the display device.

According to an exemplary embodiment of the present disclosure, a display device includes a first pixel region including a plurality of first pixels and a plurality of first gate control lines coupled to the first pixels, and a second pixel region spaced apart from the first pixel region. The second pixel region includes a plurality of second pixels and a plurality of second gate control lines coupled to the second pixels. The display device further includes a first non-pixel region disposed between the first pixel region and the second pixel region, and a first coupling line disposed in the first non-pixel region. The first coupling line commonly couples at least two first gate control lines and at least two second gate control lines.

In an exemplary embodiment, the first gate control lines include at least some of a plurality of first scan lines, a plurality of first initialization control lines, and a plurality of first emission control lines, which control driving of the first pixels. Further, the second gate control lines include at least some of a plurality of second scan lines, a plurality of second initialization control lines, and a plurality of second emission control lines, which control driving of the second pixels.

In an exemplary embodiment, the first coupling line commonly couples ith and (i+1)th first emission control lines disposed on ith and (i+1)th horizontal lines of the first pixel region, and ith and (i+1)th second emission control lines disposed on ith and (i+1)th horizontal lines of the second pixel region, in which i is a natural number.

In an exemplary embodiment, the display device further includes a second coupling line disposed at one side of the first pixel region or the second pixel region. The second coupling line couples the ith and (i+1)th first emission control lines or the ith and (i+1)th second emission control lines.

In an exemplary embodiment, the display device further includes an emission control driver including a kth emission control stage that supplies an emission control signal to the ith and (i+1)th first emission control lines and the ith and (i+1)th second emission control lines, in which k is a natural number.

In an exemplary embodiment, the emission control driver includes a plurality of emission control stages sequentially disposed at one side of the first pixel region or the second pixel region. The plurality of emission control stages includes the kth emission control stage.

In an exemplary embodiment, the emission control driver includes a plurality of emission control stages alternately disposed at one side of the first pixel region and one side of the second pixel region. The plurality of emission control stages includes the kth emission control stage.

In an exemplary embodiment, the first coupling line commonly couples an ith first scan line and an ith second scan line, which are respectively disposed on ith horizontal lines of the first and second pixel regions, and an (i+1)th first initialization control line and an (i+1)th second initialization control line, which are respectively disposed on an (i+1)th horizontal line of the first and second pixel regions, in which i is a natural number.

In an exemplary embodiment, the display device further includes a second coupling line disposed at one side of the first pixel region or the second pixel region. The second coupling line couples the ith first scan line and the (i+1)th first initialization control line, or the ith second scan line and the (i+1)th second initialization control line.

In an exemplary embodiment, the display device further includes a scan driver including an ith scan stage that supplies a scan signal to the ith first scan line, the ith second scan line, the (i+1)th first initialization control line, and the (i+1)th second initialization control line.

In an exemplary embodiment, the scan driver includes a plurality of scan stages sequentially disposed at one side of the first pixel region or the second pixel region, in which the plurality of scan stages includes the ith scan stage.

In an exemplary embodiment, the scan driver includes a plurality of scan stages alternately disposed at one side of the first pixel region and one side of the second pixel region. The plurality of scan stages includes the ith scan stage.

In an exemplary embodiment, the display device further includes a third pixel region disposed at one side of the first and second pixel regions and contacting the first and second pixel regions. The third pixel region includes a plurality of third pixels.

In an exemplary embodiment, the display device further includes a fourth pixel region disposed opposite to the third pixel region. The first pixel region, the second pixel region, and the first non-pixel region are interposed between the third pixel region and the fourth pixel region.

In an exemplary embodiment, the display device further includes an opening disposed in the first non-pixel region.

In an exemplary embodiment, the display device further includes a plurality of first coupling lines including the first coupling line. The plurality of first coupling lines is disposed in the first non-pixel region, and the first coupling lines are disposed in the first non-pixel region at an upper end of the opening and at a lower end of the opening.

In an exemplary embodiment, the display device further includes a substrate. The first and second pixels are arranged on one surface of the substrate. The substrate includes a plurality of protrusion parts corresponding to the first and second pixel regions, and a concave part corresponding to the first non-pixel region.

According to an exemplary embodiment of the present disclosure, a display device includes a first pixel region including a plurality of first pixels and a plurality of first gate control lines coupled to the first pixels, and a second pixel region spaced apart from the first pixel region. The second pixel region includes a plurality of second pixels and a plurality of second gate control lines coupled to the second pixels. The display device further includes a first non-pixel region disposed between the first pixel region and the second pixel region. The first non-pixel region includes a recess. The display device further includes a first coupling line disposed in the first non-pixel region. The first coupling line commonly couples at least two of the first gate control lines and at least two of the second gate control lines.

In an exemplary embodiment, the first gate control lines include at least some of a plurality of first scan lines, a plurality of first initialization control lines, and a plurality of first emission control lines, which control driving of the first pixels. Further, the second gate control lines include at least some of a plurality of second scan lines, a plurality of second initialization control lines, and a plurality of second emission control lines, which control driving of the second pixels.

In an exemplary embodiment, the first coupling line commonly couples ith and (i+1)th first emission control lines disposed on ith and (i+1)th horizontal lines of the first pixel region, and ith and (i+1)th second emission control lines disposed on ith and (i+1)th horizontal lines of the second pixel region, in which i is a natural number.

In an exemplary embodiment, the display device further includes a second coupling line disposed in a second non-pixel region at one side of the first pixel region or the second pixel region. The second coupling line couples the ith and (i+1)th first emission control lines or the ith and (i+1)th second emission control lines.

In an exemplary embodiment, the first coupling line commonly couples an ith first scan line and an ith second scan line, which are respectively disposed on ith horizontal lines of the first and second pixel regions, and an (i+1)th first initialization control line and an (i+1)th second initialization control line, which are respectively disposed on an (i+1)th horizontal line of the first and second pixel regions, in which i is a natural number.

In an exemplary embodiment, the display device further includes a second coupling line disposed in a second non-pixel region at one side of the first pixel region or the second pixel region. The second coupling line couples the ith first scan line and the (i+1)th first initialization control line, or the ith second scan line and the (i+1)th second initialization control line.

According to an exemplary embodiment of the present disclosure, a display device includes a substrate including a first protrusion part, a second protrusion part, and a notch region disposed between the first and second protrusion parts. The display device further includes a first pixel region disposed on the first protrusion part, in which the first pixel region includes a first row of first pixels and a first gate control line coupled to the first row of first pixels, and a second row of first pixels and a second gate control line coupled to the second row of first pixels. The display device further includes a second pixel region disposed on the second protrusion part, in which the second pixel region includes a first row of second pixels and a third gate control line coupled to the first row of second pixels, and a second row of second pixels and a fourth gate control line coupled to the second row of second pixels. The display device further includes a first non-pixel region disposed in the notch region, and a first coupling line disposed in the first non-pixel region, in which the first coupling line is coupled to the first gate control line, the second gate control line, the third gate control line, and the fourth gate control line.

BRIEF DESCRIPTION OF THE DRAWINGS

The above and other features of the present disclosure will become more apparent by describing in detail exemplary embodiments thereof with reference to the accompanying drawings, in which.

DETAILED DESCRIPTION OF THE EXEMPLARY EMBODIMENTS

Figure 1:
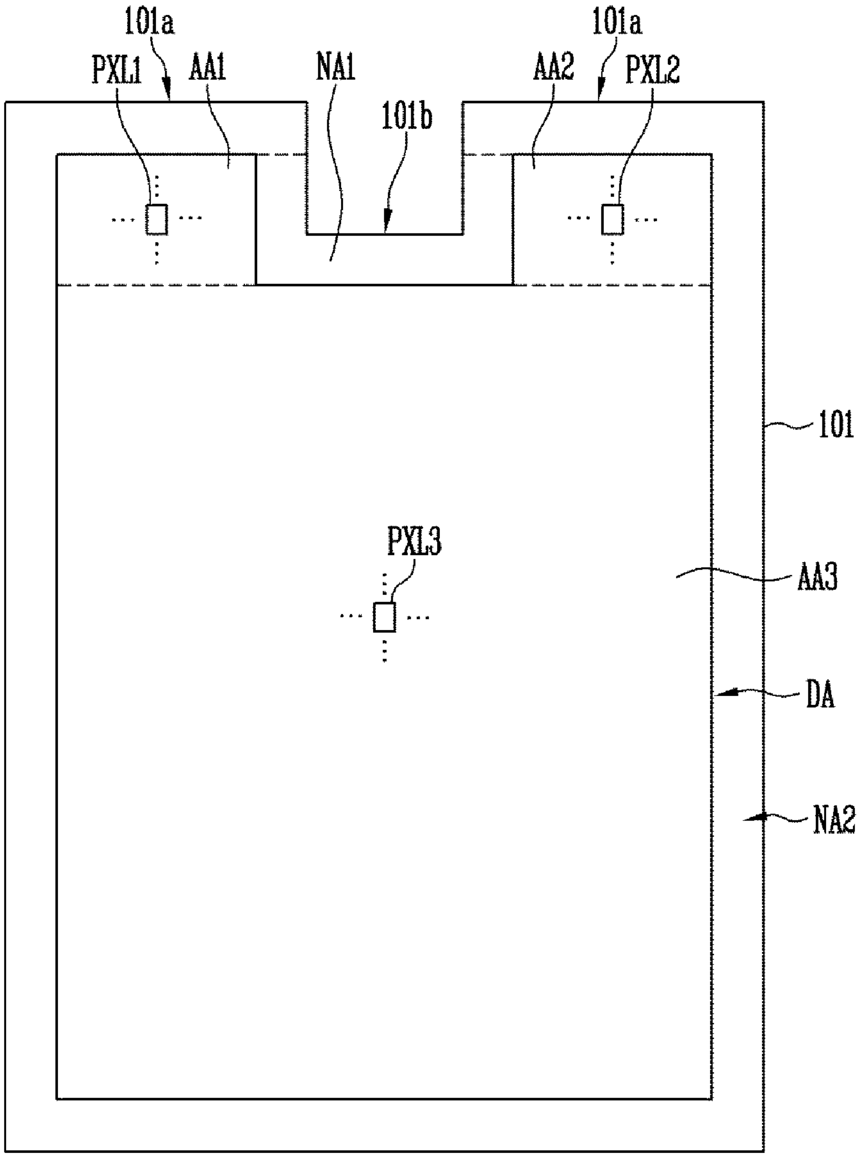
FIGS. 1 to 12 each illustrates a display region and a substrate on which the display region is formed according to an exemplary embodiment of the present disclosure.

Exemplary embodiments of the present disclosure will be described more fully hereinafter with reference to the accompanying drawings. Like reference numerals may refer to like elements throughout the accompanying drawings.

It will be understood that when a component is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present.

It will be understood that the terms "first," "second," "third," etc. are used herein to distinguish one element from another, and the elements are not limited by these terms.

Thus, a "first" element in an exemplary embodiment may be described as a "second" element in another exemplary embodiment.

FIGS. 1 to 12 each illustrates a display region and a substrate on which the display region is formed according to an exemplary embodiment of the present disclosure. For example, FIGS. 1 to 12 illustrate exemplary embodiments related to a display region that may be provided in a display device according to an exemplary embodiment of the present disclosure, and the shape of a substrate having the display region formed thereon.

Referring to FIG. 1, in an exemplary embodiment, a substrate 101 is a display substrate that constitutes a base substrate of a display panel. A display region DA in which an image is displayed, a first non-pixel region NA1 disposed at one side of the display region DA, and a second non-pixel region NA2 disposed at the periphery of the display region DA and the first non-pixel region NA1, are defined on the substrate 101. In this exemplary embodiment, a specific region (e.g., a non-pixel region between first and second pixel regions AA1 and AA2 at an upper end of the display region DA) in the non-pixel region in which pixels are not disposed will be referred to as a first non-pixel region NA1, and the remaining non-pixel region other than the first non-pixel region NA1 will be referred to as a second non-pixel region NA2.

The substrate 101 may be made of a glass or plastic material. However, exemplary embodiments of the present disclosure are not limited thereto. For example, the substrate 101 may be a flexible substrate including at least one of polyethersulfone (PES), polyacrylate (PA), polyetherimide (PEI), polyethylene naphthalate (PEN), polyethylene terephthalate (PET), polyphenylene sulfide (PPS), polyarylate (PAR), polyimide (PI), polycarbonate (PC), triacetate cellulose (TAC), and cellulose acetate propionate (CAP). Further, the substrate 101 may be a rigid substrate including one of glass or tempered glass. Further, the substrate 101 may be made of a transparent material such as, for example, a light transmitting substrate. However, exemplary embodiments of the present disclosure are not limited thereto. Further, the substrate 101 may be configured to have different materials and/or different structures according to regions, so that different characteristics are exhibited for the respective regions. Further, the substrate 101 may have a single- or multi-layered structure. However, the structure of the substrate 101 is not limited thereto.

The display region DA includes the first pixel region AA1 and the second pixel region AA2, which are spaced apart from each other with the first non-pixel region NA1 interposed therebetween. In exemplary embodiments, the display region DA may further include a third pixel region AA3 disposed at one side of the first and second pixel regions AA1 and AA2. For example, the third pixel region AA3 may be disposed at one side of the first and second pixel regions AA1 and AA2 to be in contact with the first and second pixel regions AA1 and AA2. As an example, the first pixel region AA1 may be disposed at a left upper end of the third pixel region AA3, and the second pixel region AA2 may be disposed at a right upper end of the third pixel region AA3 to be spaced apart from the first pixel region AA1. In this case, the first non-pixel region NA1 may be disposed at an upper center of the third pixel region AA3.

At least two pixel regions among the first, second, and third pixel regions AA1, AA2, and AA3 may have different widths and/or different areas. For example, the third pixel region AA3 may occupy the widest area in the display region DA while having the widest width, and each of the first pixel region AA1 and the second pixel region AA2 may have an area smaller than that of the third pixel region AA3 while having a width narrower than that of the third pixel region AA3. In addition, the first pixel region AA1 and the second pixel region AA2 may have the same width and/or the same area, or may have different widths and/or different areas.

A plurality of first pixels PXL1, a plurality of second pixels PXL2, and a plurality of third pixels PXL3 may be disposed in the first pixel region AA1, the second pixel region AA2, and the third pixel region AA3, respectively. The first pixel region AA1, the second pixel region AA2, and the third pixel region AA3 may have the same structure, or at least some of the first pixel region AA1, the second pixel region AA2, and the third pixel region AA3 may have different structures. That is, in exemplary embodiments of the present disclosure, the structure of the first, second, and third pixels PXL1, PXL2, and PXL3 is not particularly limited. Each of the first, second, and third pixels PXL1, PXL2, and PXL3 may be a self-luminescent pixel including an organic light emitting diode. However, exemplary embodiments of the present disclosure are not limited thereto.

The first, second, and third pixels PXL1, PXL2, and PXL3 are disposed on the substrate 101 on which the first, second, and third pixel regions AA1, AA2, and AA3 are defined. For example, the first, second, and third pixels PXL1, PXL2, and PXL3 may be formed on the same one surface of the substrate 101.

Pixels are not disposed in the first non-pixel region NA1 and the second non-pixel region NA2. For example, the first non-pixel region NA1 and the second non-pixel region NA2 constitute a non-display region in which no pixels are included. Lines for driving the pixels PXL1, PXL2, and PXL3 of the display region DA may be disposed in the first non-pixel region NA1 and/or the second non-pixel region NA2. For example, lines for supplying various driving signals and/or various driving power sources to the pixels PXL1, PXL2, and PXL3 may be disposed in the first non-pixel region NA1 and/or the second non-pixel region NA2. Further, in exemplary embodiments, at least one driving circuit unit for driving the pixels PXL1, PXL2, and PXL3 may be disposed in the first non-pixel region NA1 and/or the second non-pixel region NA2. As an example, at least one of a scan driver, an emission controller, and a data driver may be disposed in the second non-pixel region NA2. Herein, the scan driver may also be referred to as a scan driver circuit, the emission controller may also be referred to as an emission controller circuit, and the data driver may also be referred to as a data driver circuit.

The shapes of the display region DA and the first non-pixel region NA1 may be variously modified. For example, the display region DA and/or the first non-pixel region NA1 may have a polygonal shape, a circular shape, an elliptical shape, or a combined shaped thereof.

In exemplary embodiments, the substrate 101 may include a recess (also referred to as a partial opening or an indentation) disposed between the first and second pixel regions AA1 and AA2. As an example, the substrate 101 may include a protrusion part 101*a* corresponding to each of the first and second pixel regions AA1 and AA2, and a concave part 101*b* (also referred to as a notch region) corresponding to the first non-pixel region NA1. For example, in exemplary embodiments, one region in the first non-pixel region NA1 may be recessed. When the substrate 101 includes the concave part 101*b*, the internal space of the display device can be more efficiently used. For example, a component such as a camera, a speaker, etc., may be disposed at the concave part 101*b*.

Figure 2:
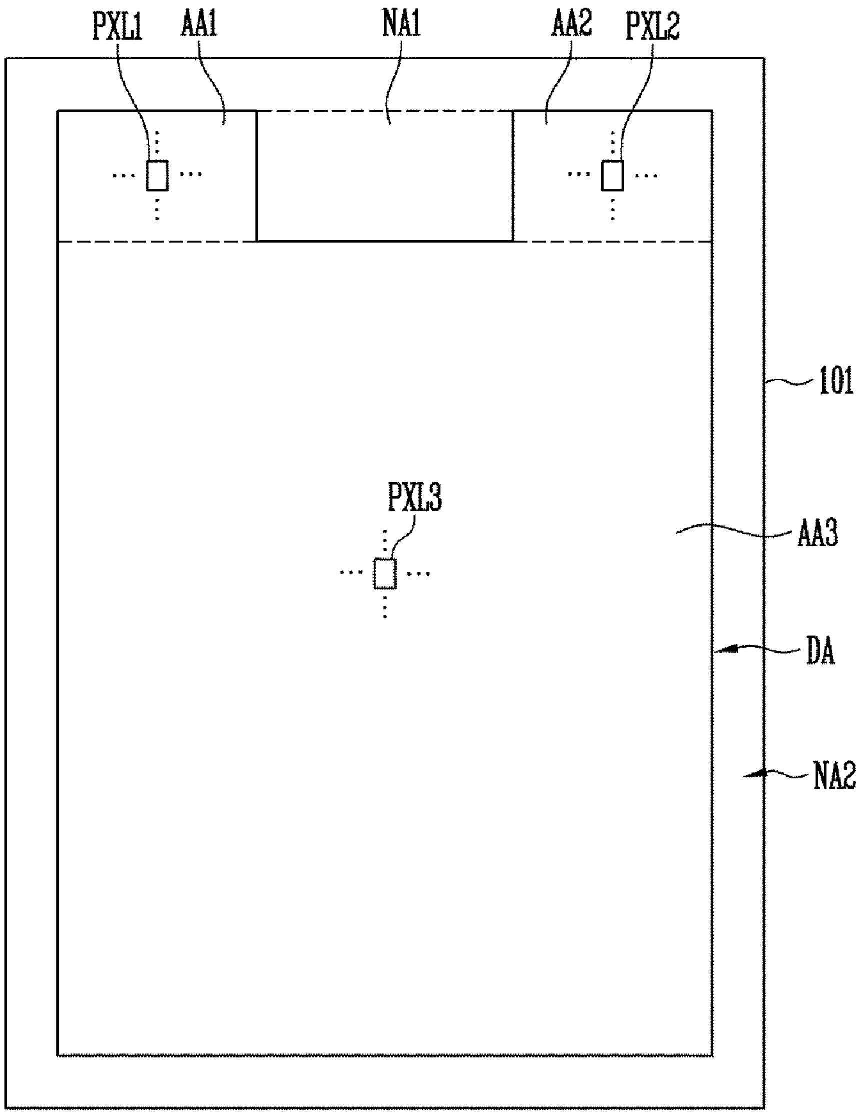

It is to be understood that the shape of the substrate 101 is not limited to the shape described above. For example, in an exemplary embodiment, the substrate 101 does not include a recess between the first and second pixel regions AA1 and AA2 as shown in FIG. 2. As an example, the substrate 101 may be a rectangular or square substrate including the display region DA, the first non-pixel region NA1, and the second non-pixel region NA2. However, the shape of the substrate 101 is not limited thereto. For example, at least one corner part of the substrate 101 may have a diagonal shape, a step shape, a curved shape, etc.

Figure 3:
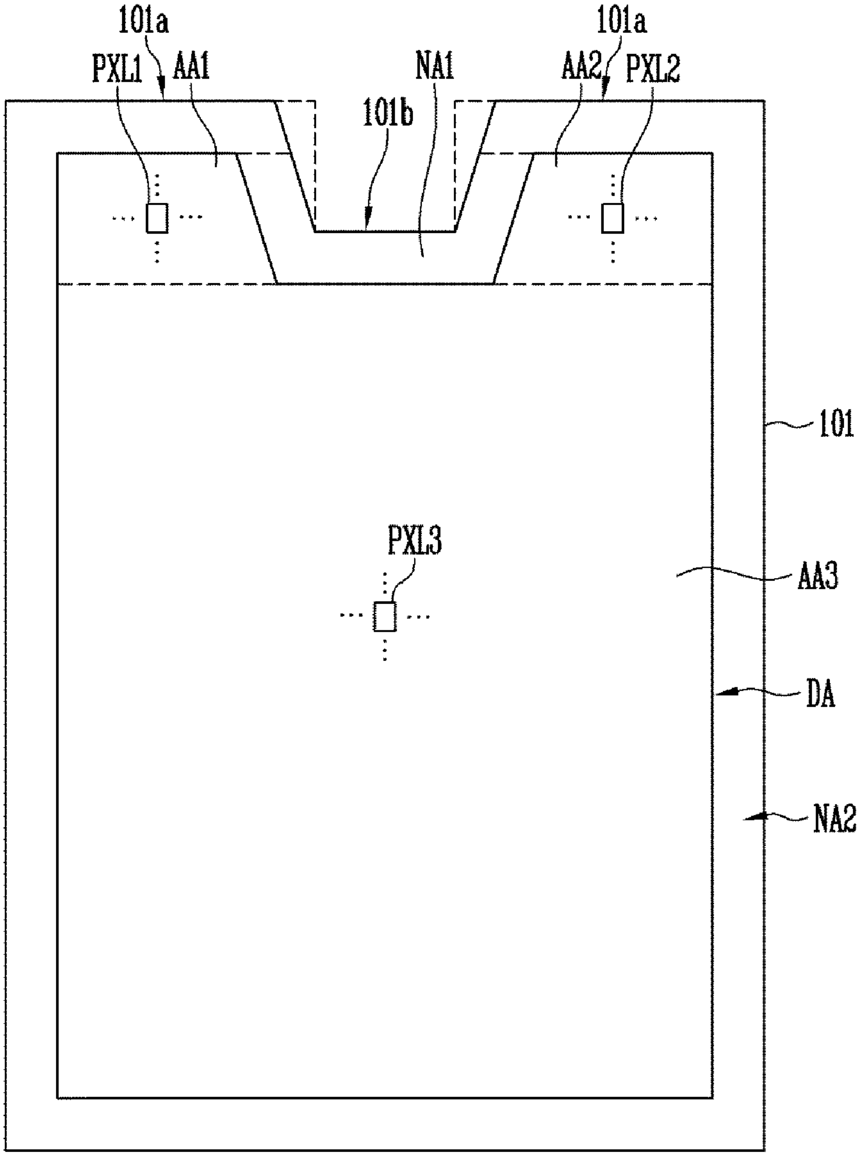
Figure 4:
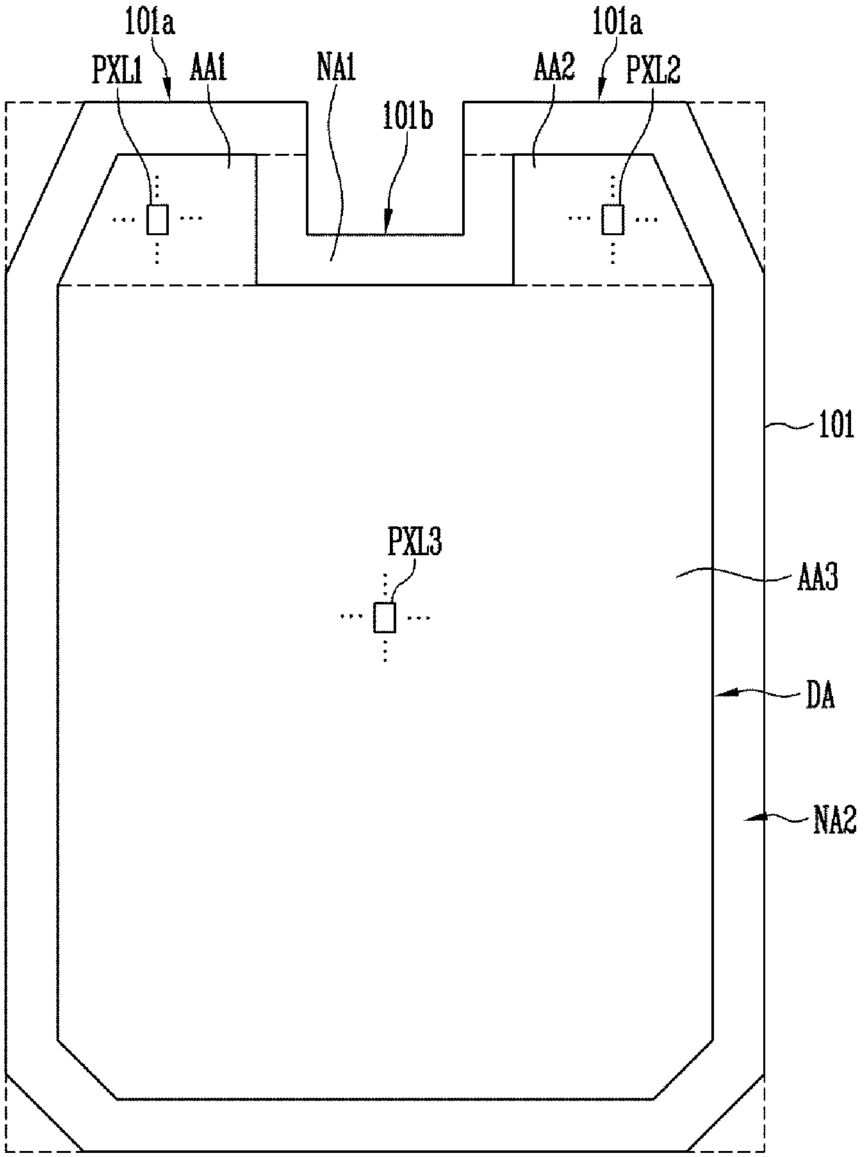
Figure 5:
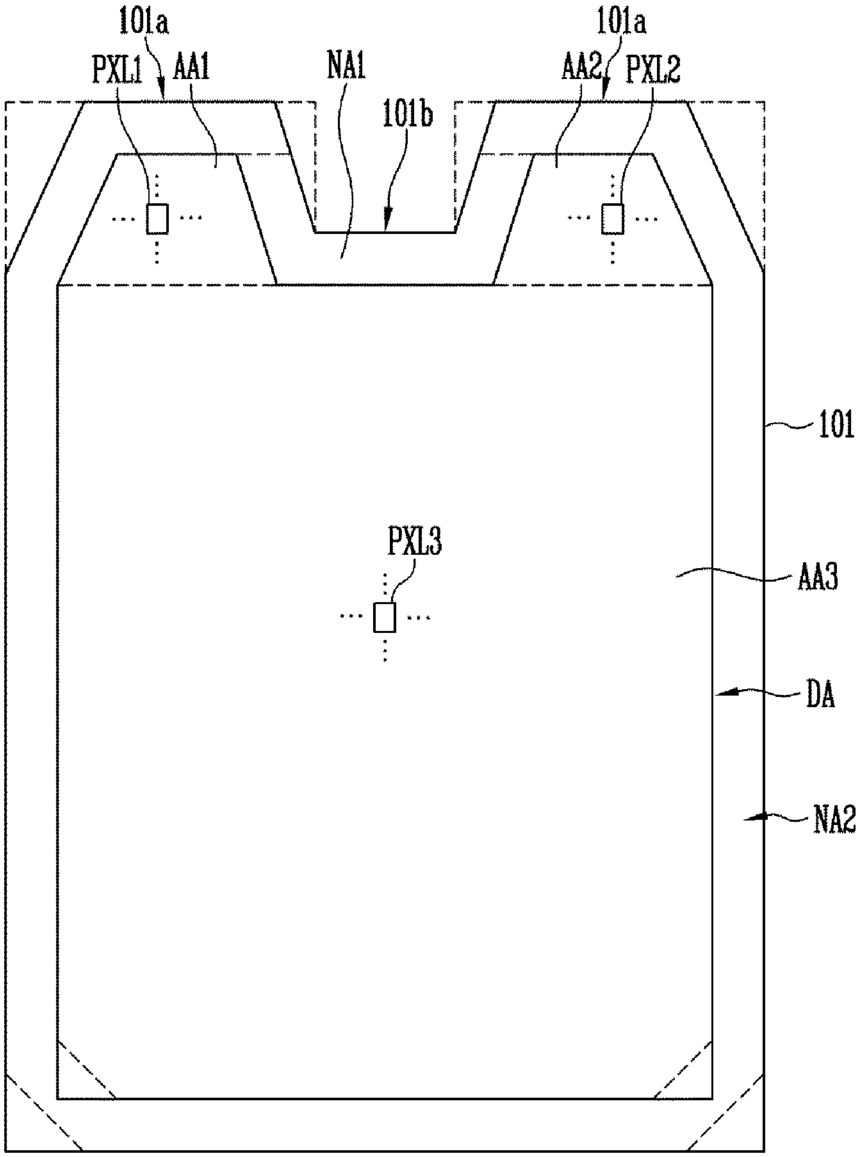

The shape of each of the first pixel region AA1, the second pixel region AA2, the third pixel region AA3, and/or the first non-pixel region NA1 may also be variously modified. For example, as shown in FIGS. 3 to 5, in exemplary embodiments, at least one region of the first pixel region AA1, the second pixel region AA2, the third pixel region AA3, and/or the first non-pixel region NA1 may have a diagonal shape having inclined portions that have a predetermined inclination. As an example, the first pixel region AA1, the second pixel region AA2, the third pixel region AA3, and/or the first non-pixel region NA1 may have a diagonal shape at at least one corner part thereof. In this case, the width of each of the first pixel region AA1, the second pixel region AA2, the third pixel region AA3, and/or the first non-pixel region NA1 may be gradually changed in at least one region thereof.

For example, referring to FIG. 3, in an exemplary embodiment, edges of the substrate 101 that connect the protrusion parts 101*a* and the concave part 101*b* are inclined. In addition, the boundary between the first pixel region AA1 and the first non-pixel region NA1 is inclined, and the boundary between the second pixel region AA2 and the first non-pixel region NA1 is inclined.

Referring to FIG. 4, in an exemplary embodiment, edges of the substrate 101 that define the outer boundaries of the protrusion parts 101 at a top portion of the substrate 101 are inclined. In addition, opposing edges of the substrate 101 that define the outer boundaries of the substrate 101 at a bottom portion of the substrate 101 are inclined. In addition, boundaries between the third pixel region AA3 and the second non-pixel region NA2 at a top portion of the substrate 101 and at a bottom portion of the substrate 101 are inclined.

Referring to FIG. 5, in an exemplary embodiment, edges of the substrate 101 that connect the protrusion parts 101*a* and the concave part 101*b* are inclined. In addition, the boundary between the first pixel region AA1 and the first non-pixel region NA1 is inclined, and the boundary between the second pixel region AA2 and the first non-pixel region NA1 is inclined. In addition, the boundary between the first pixel region AA1 and the second non-pixel region NA2 is inclined, and the boundary between the second pixel region AA2 and the second non-pixel region NA2 is inclined. In addition, edges of the substrate 101 that define the outer boundaries of the protrusion parts 101 at a top portion of the substrate 101 are inclined.

Figure 6:
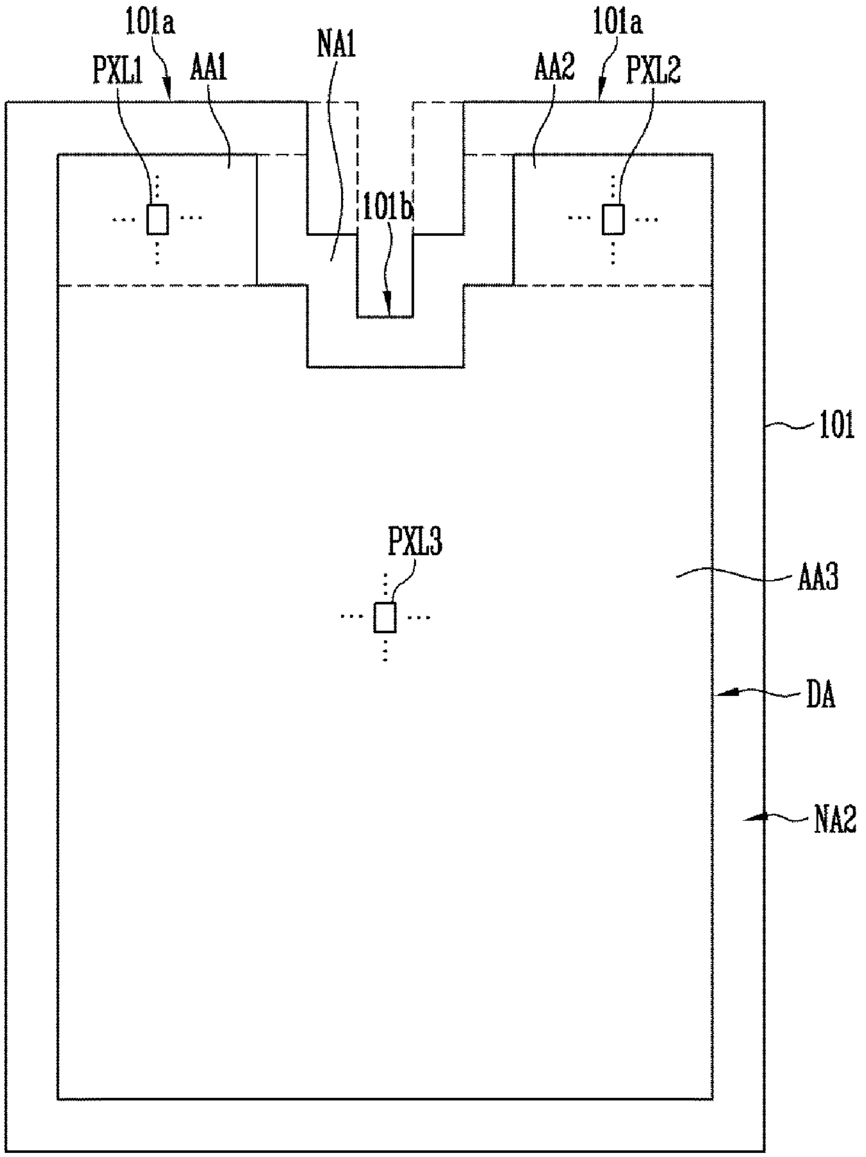
Figure 7:
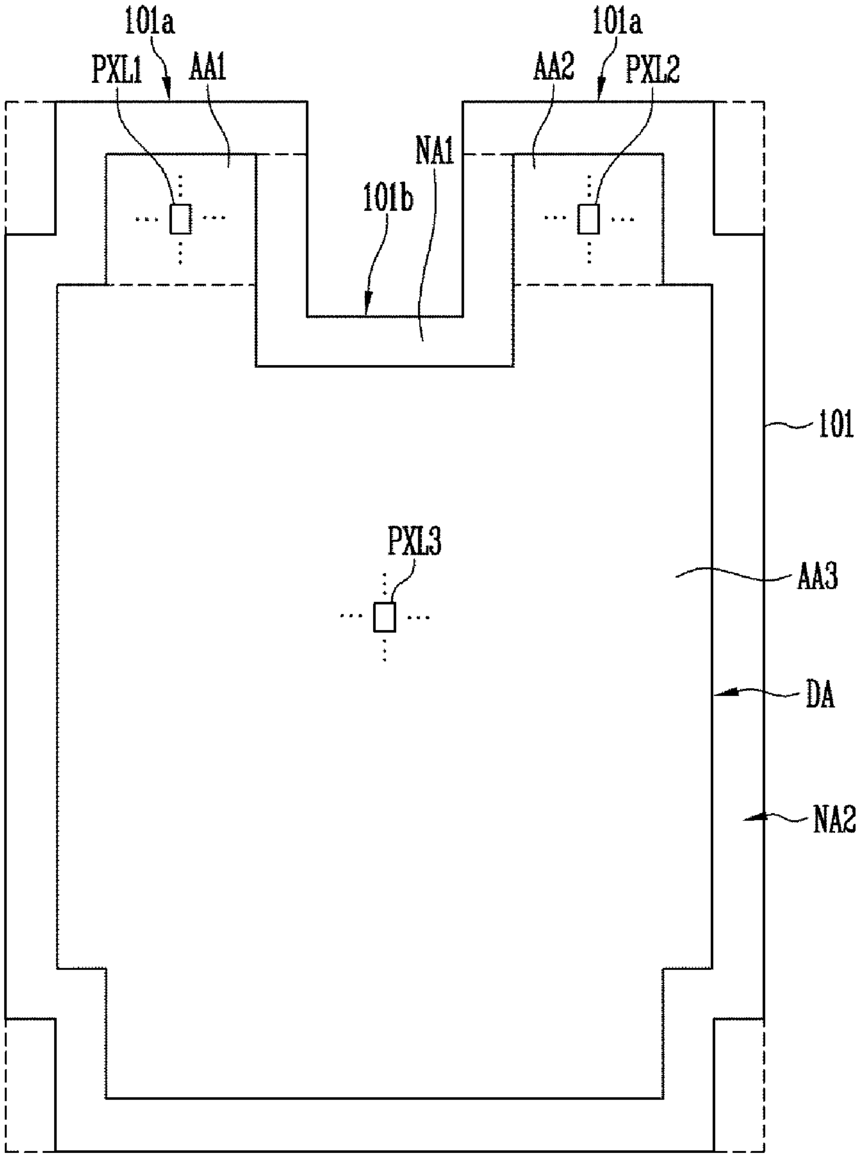

In addition, as shown in FIGS. 6 and 7, in exemplary embodiments, at least one region of the first pixel region AA1, the second pixel region AA2, the third pixel region AA3, and/or the first non-pixel region NA1 may have a step shape having at least one step difference.

For example, referring to FIG. 6, in an exemplary embodiment, a boundary between the first pixel region AA1 and the first non-pixel region NA1 has a step shape, a boundary between the second pixel region AA2 and the first non-pixel region NA1 has a step shape, and edges of the substrate 101 that connect the protrusion parts 101*a* and the concave part 101*b* have a step shape.

Referring to FIG. 7, in an exemplary embodiment, edges of the substrate 101 that define the outer boundaries of the protrusion parts 101 at a top portion of the substrate 101 have a step shape. In addition, opposing edges of the substrate 101 that define the outer boundaries of the substrate 101 at a bottom portion of the substrate 101 have a step shape. In addition, boundaries between the third pixel region AA3 and the second non-pixel region NA2 at a top portion of the substrate 101 and at a bottom portion of the substrate 101 have a step shape.

Figure 8:
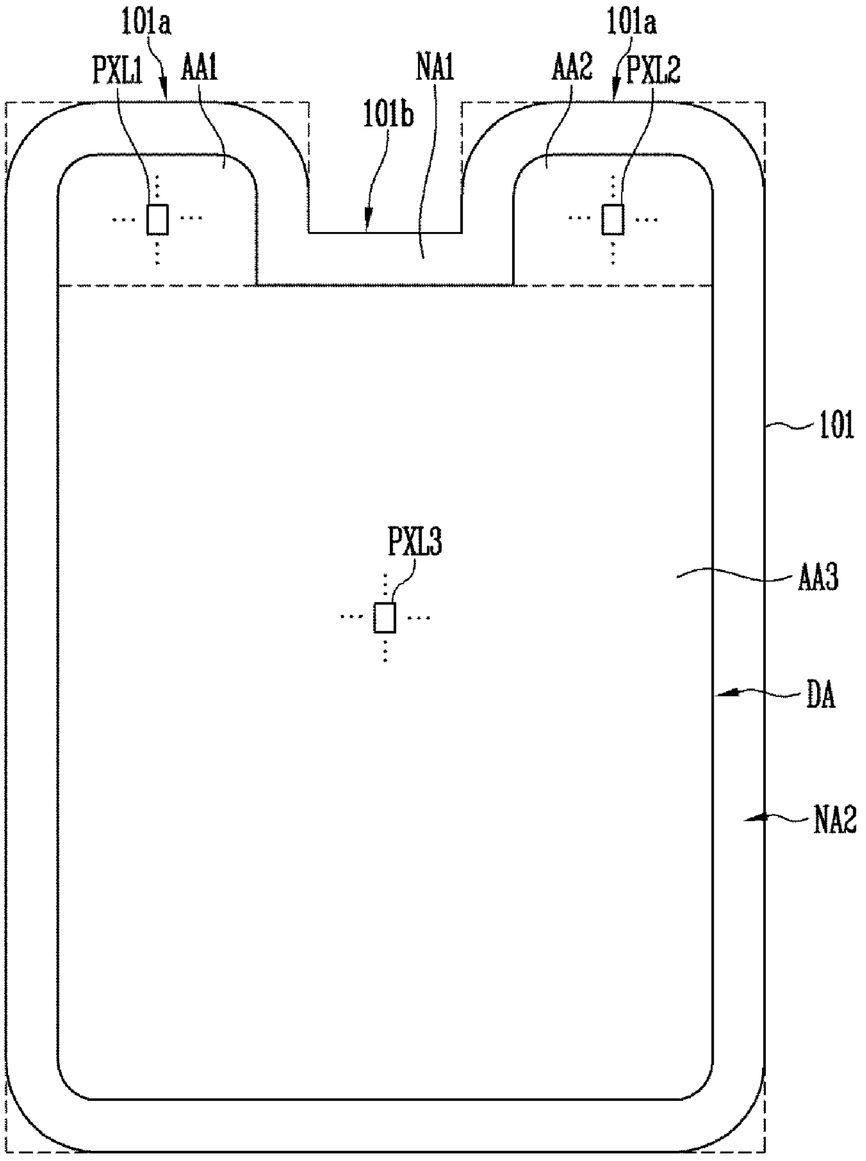
Figure 9:
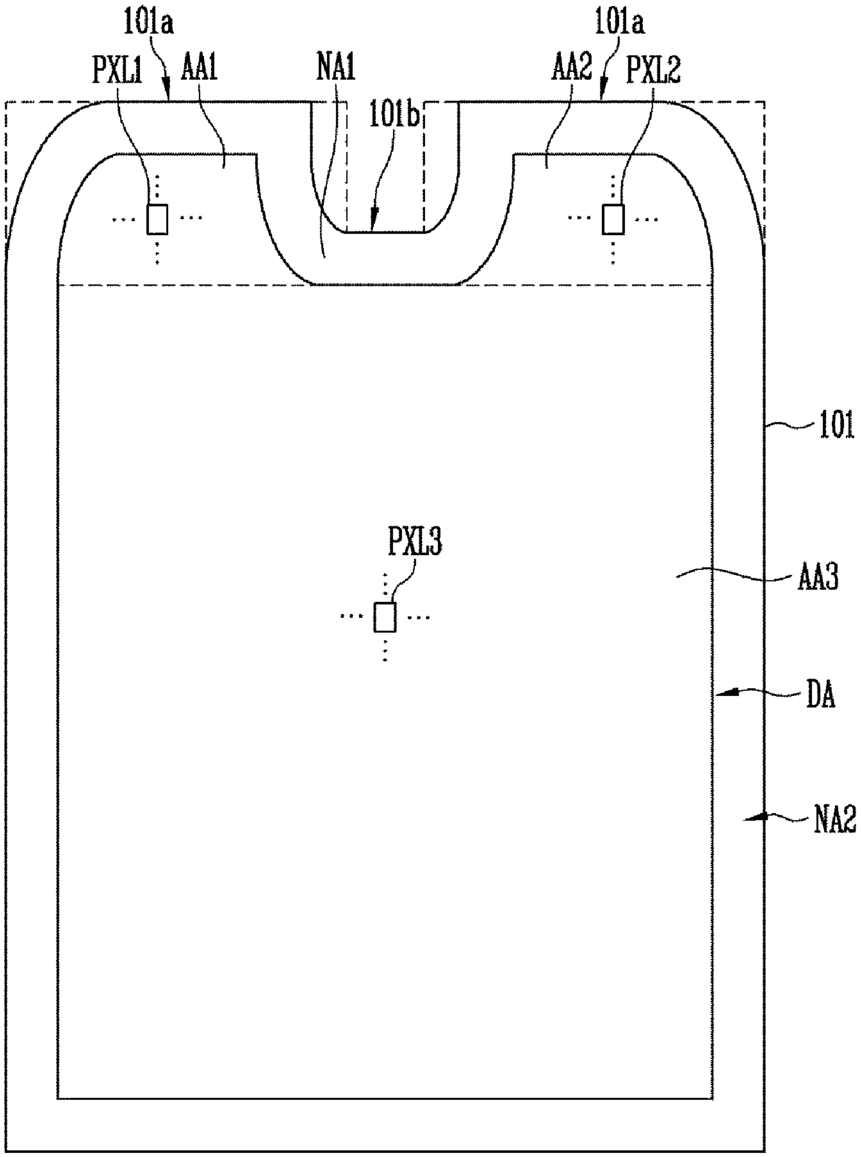
Figure 10:
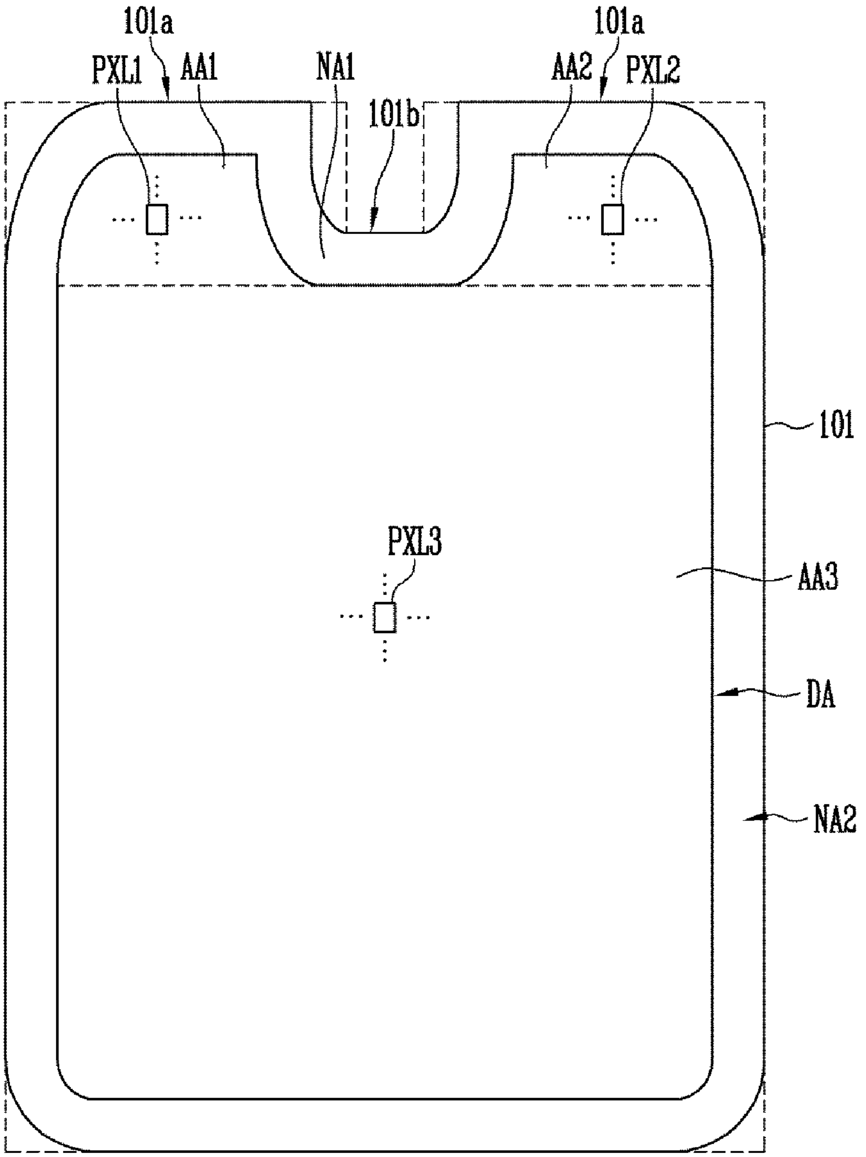

In addition, as shown in FIGS. 8 to 10, at least one region of the first pixel region AA1, the second pixel region AA2, the third pixel region AA3, and/or the first non-pixel region NA1 may have a curved shape.

For example, referring to FIG. 8, in an exemplary embodiment, edges of the substrate 101 that define the outer boundaries of the protrusion parts 101 at a top portion of the substrate 101 have a curved shape. In addition, opposing edges of the substrate 101 that define the outer boundaries of the substrate 101 at a bottom portion of the substrate 101 have a curved shape. In addition, boundaries between the third pixel region AA3 and the second non-pixel region NA2 at a top portion of the substrate 101 and at a bottom portion of the substrate 101 have a curved shape. In addition, boundaries between the first and second pixel regions AA1 and AA2 and the first non-pixel region NA1 have a curved shape.

Referring to FIG. 9, in an exemplary embodiment, edges of the substrate 101 that connect the protrusion parts 101*a* and the concave part 101*b* have a curved shape. In addition, the boundary between the first pixel region AA1 and the first non-pixel region NA1 has a curved shape, and the boundary between the second pixel region AA2 and the first non-pixel region NA1 has a curved shape. In addition, the boundary between the first pixel region AA1 and the second non-pixel region NA2 has a curved shape, and the boundary between the second pixel region AA2 and the second non-pixel region NA2 has a curved shape. In addition, edges of the substrate 101 that define the outer boundaries of the protrusion parts 101 at a top portion of the substrate 101 have a curved shape.

Referring to FIG. 10, in an exemplary embodiment, edges of the substrate 101 that connect the protrusion parts 101*a* and the concave part 101*b* have a curved shape. In addition, the boundary between the first pixel region AA1 and the first non-pixel region NA1 has a curved shape, and the boundary between the second pixel region AA2 and the first non-pixel region NA1 has a curved shape. In addition, the boundary between the first pixel region AA1 and the second non-pixel region NA2 has a curved shape, and the boundary between the second pixel region AA2 and the second non-pixel region NA2 has a curved shape. In addition, edges of the substrate 101 that define the outer boundaries of the protrusion parts 101 at both a top portion and a bottom portion of the substrate 101 have a curved shape.

In addition, in exemplary embodiments, the substrate 101 may have a shape corresponding to that of the display region DA. As an example, at least one region (e.g., at least one corner part) of the substrate 101 may have a diagonal shape, a step shape, a curved shape, etc., corresponding to the shape of the display region DA. However, exemplary embodiments of the present disclosure are not limited thereto. For example, the substrate 101 may have a corner part (e.g., a right-angled corner part indicated by a dotted line in the figures) that has a right angle regardless of the shape of the display region DA.

Figure 11:
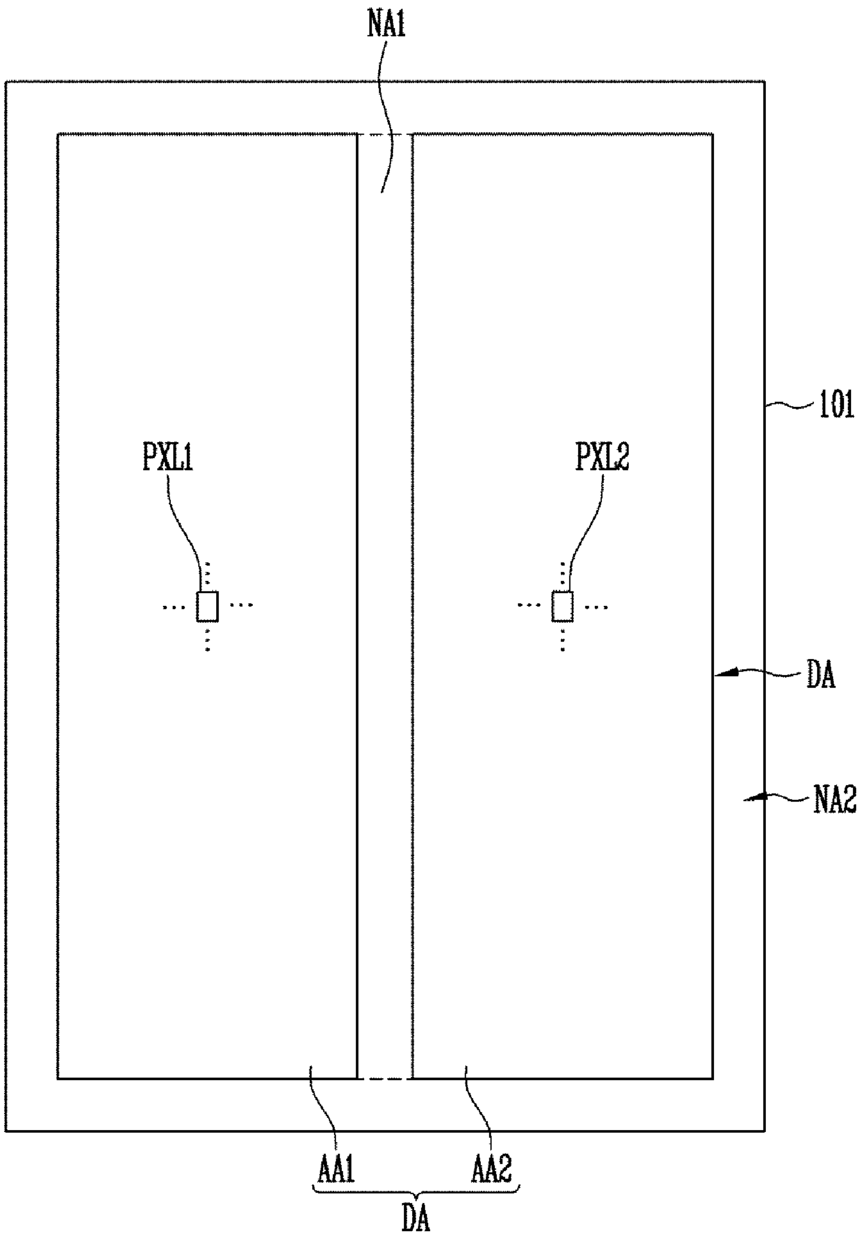

Although exemplary embodiments in which the display region DA includes three pixel regions (e.g., the first, second, and third pixel regions AA1, AA2, and AA3) is disclosed with reference to FIGS. 1 to 10, it is to be understood that exemplary embodiments of the present disclosure are not limited thereto. For example, as shown in FIG. 11, in an exemplary embodiment, the display region DA may be configured to include only two pixel regions (e.g., the first and second pixel regions AA1 and AA2) which are disposed adjacent to each other and are spaced apart from each other with the first non-pixel region NA1 interposed therebetween.

Figure 12:
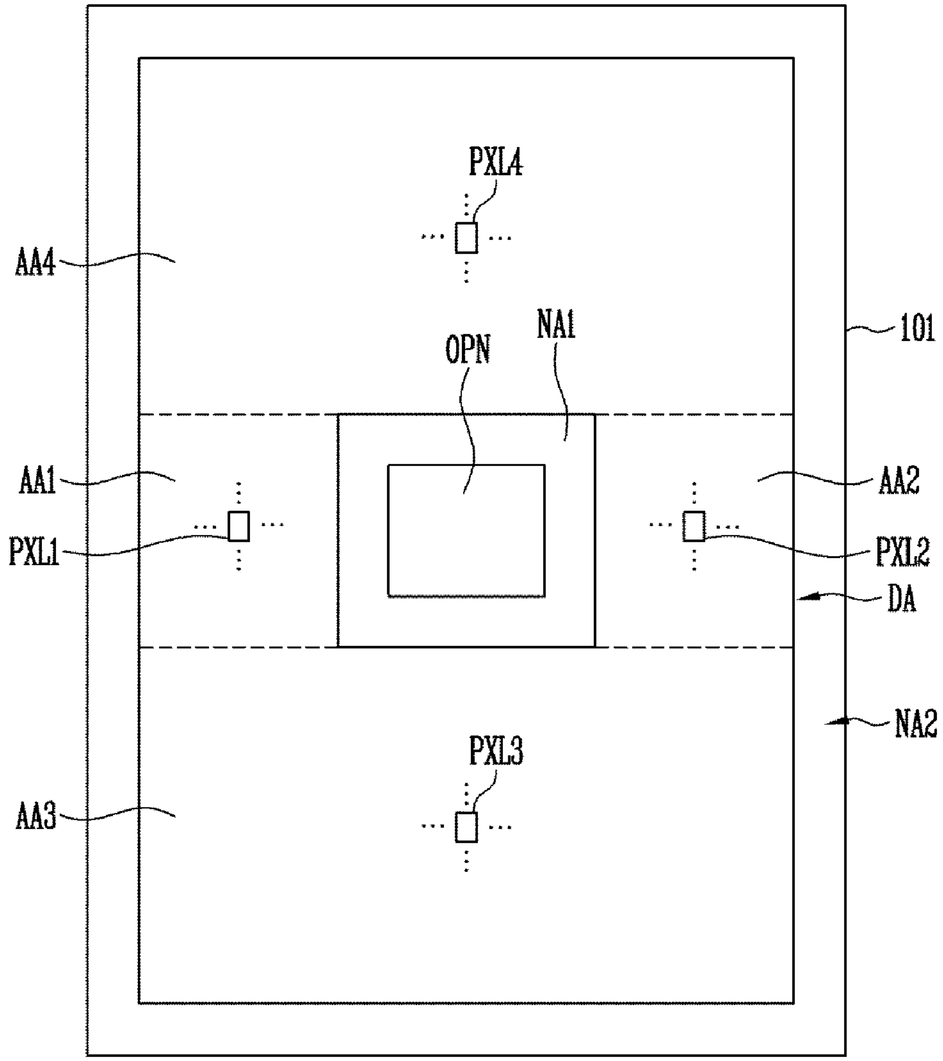

Alternatively, in exemplary embodiments, the display region DA may further include at least one pixel region in addition to the first, second, and third pixel regions AA1, AA2, and AA3. For example, as shown in FIG. 12, in an exemplary embodiment, the display region DA may further include a fourth pixel region AA4 that includes fourth pixels PXL4 disposed opposite to the third pixel region AA3, with the first and second pixel regions AA1 and AA2 and the first non-pixel region NA1 which are interposed therebetween. In this case, the first non-pixel region NA1 may be disposed at a central portion of the display region DA and may be surrounded by the first to fourth pixel regions AA1, AA2, AA3, and AA4.

In addition, in an exemplary embodiment, at least one opening OPN may be disposed in the first non-pixel region NA1. Alternatively, in an exemplary embodiment, the first non-pixel region NA1 does not include the at least one opening OPN. For example, the substrate 101 may or may not include the opening OPN disposed in the first non-pixel region NA1.

Figure 13:
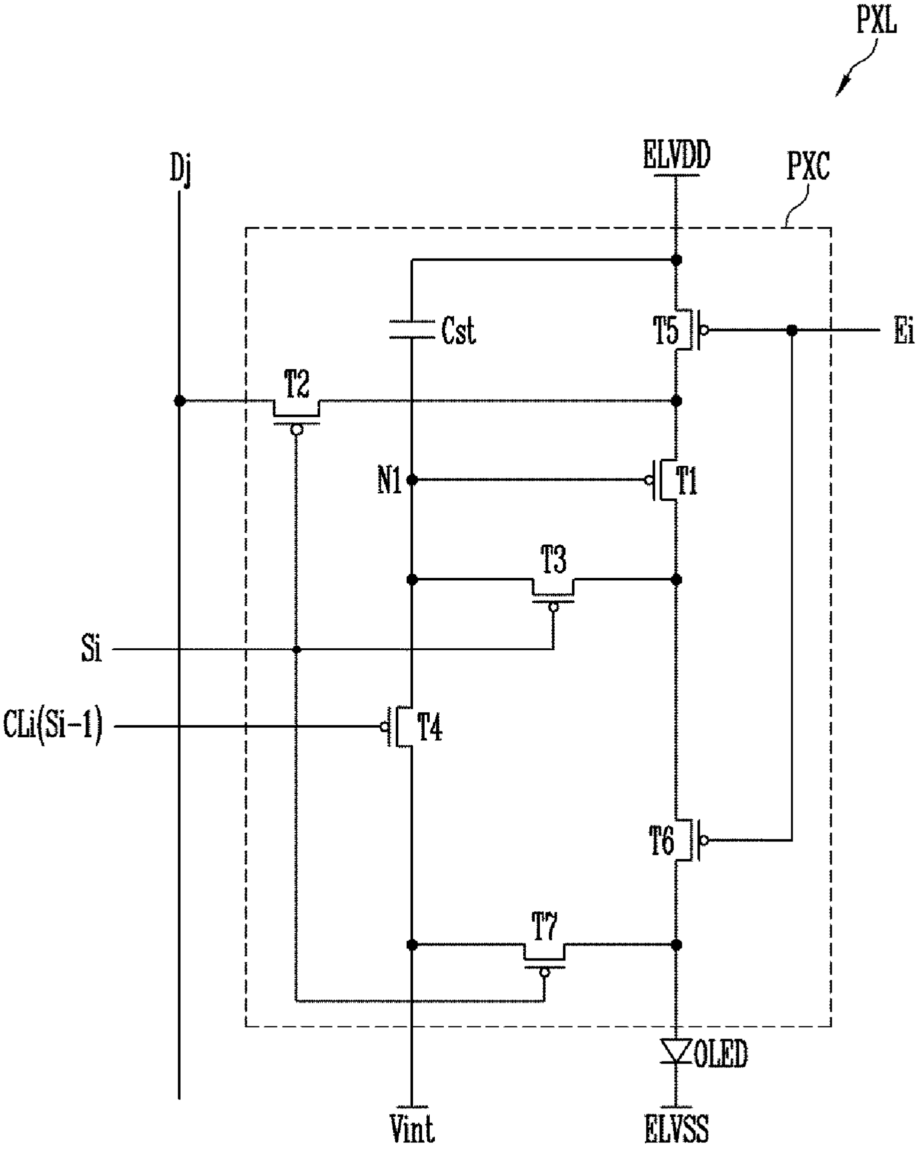
FIG. 13 illustrates a pixel according to an exemplary embodiment of the present disclosure.

FIG. 13 illustrates a pixel according to an exemplary embodiment of the present disclosure. For convenience of explanation, an arbitrary pixel PXL disposed on an ith (i is a natural number) horizontal line and a jth (j is a natural number) vertical line of the display region DA is illustrated in FIG. 13. Herein, a natural number refers to a positive integer, and does not include zero. The pixel PXL may be any one of the first, second, and third pixels PXL1, PXL2, and PXL3. In exemplary embodiments, all pixels (e.g., the first, second, and third pixels PXL1, PXL2, and PXL3) arranged in the display region DA may have substantially the same structure. It is to be understood that the structure of the first, second, and third pixels PXL1, PXL2, and PXL3 is not limited to the structure shown in FIG. 13. For example, the structure of the first, second, and third pixels PXL1, PXL2, and PXL3 may be variously modified.

Referring to FIG. 13, the pixel PXL according to an exemplary embodiment of the present disclosure includes an organic light emitting diode OLED and a pixel circuit PXC that controls a driving current supplied to the organic light emitting diode OLED.

The organic light emitting diode OLED is coupled between a first power source ELVDD and a second power source ELVSS. As an example, an anode electrode of the organic light emitting diode OLED may be coupled to the first power source ELVDD via the pixel circuit PXC, and a cathode electrode of the organic light emitting diode OLED may be coupled to the second power source ELVSS. The organic light emitting diode OLED emits light with a luminance corresponding to a driving current supplied from the pixel circuit PXC.

The pixel circuit PXC controls the driving current flowing through the organic light emitting diode OLED corresponding to a data signal supplied through a corresponding data line (e.g., a jth data line) for every frame period. To this end, the pixel circuit PXC includes a first transistor T1, a second transistor T2, a third transistor T3, a fourth transistor T4, a fifth transistor T5, a sixth transistor T6, a seventh transistor T7, and a storage capacitor Cst.

A first electrode of the first transistor T1 (also referred to herein as a driving transistor T1) is coupled to the first power source ELVDD via the fifth transistor T5, and a second electrode of the first transistor T1 is coupled to the anode electrode of the organic light emitting diode OLED via the sixth transistor T6. In addition, a gate electrode of the first transistor T1 is coupled to a first node N1. The first transistor T1 controls a driving current flowing from the first power source ELVDD to the second power source ELVSS via the organic light emitting diode OLED corresponding to a voltage of the first node N1.

The second transistor T2 is coupled between the corresponding data line Dj and the first electrode of the first transistor T1. In addition, a gate electrode of the second transistor T2 is coupled to a corresponding scan line (e.g., an ith scan line) Si. The second transistor T2 is turned on when a scan signal is supplied to the ith scan line Si, thereby allowing the data line Dj and the first electrode of the first transistor T1 to be electrically coupled to each other. Here, the scan signal may be set as a signal having a gate-on voltage.

The third transistor T3 is coupled between the second electrode of the first transistor T1 and the first node N1. In addition, a gate electrode of the third transistor T3 is coupled to the ith scan line Si. The third transistor T3 is turned on when a scan signal is supplied to the ith scan line Si, thereby allowing the second electrode of the first transistor T1 and the first node N1 to be electrically coupled to each other. Therefore, if the third transistor is turned on, the first transistor T1 is diode-coupled.

The fourth transistor T4 is coupled between the first node N1 and an initialization power source Vint. In addition, a gate electrode of the fourth transistor T4 is coupled to an ith initialization control line CLi. The fourth transistor T4 is turned on when an initialization control signal is supplied to the ith initialization control line CLi, thereby supplying the voltage of the initialization power source Vint to the first node N1. Here, the initialization control signal may be set as a signal having the gate-on voltage, and the voltage of the initialization power source may be set as the lowest voltage or less of the data signal.

The ith initialization control line CLi is a control line that initializes pixels PXL disposed on the ith horizontal line, and the initialization control signal having the gate-on voltage is supplied to the ith initialization control line CLi before the scan signal is supplied to the ith scan line Si. As an example, the ith initialization control line CLi may be coupled to a scan line of a directly adjacent previous horizontal line (e.g., an (i−1)th scan line Si−1). In this case, a scan signal supplied to the (i−1)th scan line (e.g., a current scan signal of the directly adjacent previous horizontal line) may be used as the initialization control signal of the ith horizontal line. As described above, when the pixel PXL is initialized using a scan signal of another horizontal line, the pixels PXL can be initialized without providing a control line driver for generating a separate initialization control signal.

The fifth transistor T5 is coupled between the first power source ELVDD and the first transistor T1. In addition, a gate electrode of the fifth transistor T5 is coupled to a corresponding emission control line (e.g., an ith emission control line) Ei. The fifth transistor T5 is turned off when an emission control signal is supplied to the ith emission control line Ei, and is otherwise turned on. Here, the emission control signal may be set as a signal having a gate-off voltage.

The sixth transistor T6 is coupled between the first transistor T1 and the organic light emitting diode OLED. In addition, a gate electrode of the sixth transistor T6 is coupled to the ith emission control line Ei. The sixth transistor T6 is turned off when the emission control signal is supplied to the ith emission control line Ei, and is otherwise turned on.

The seventh transistor T7 is coupled between the initialization power source Vint and the anode electrode of the organic light emitting diode OLED. In addition, a gate electrode of the seventh transistor T7 is turned on when the scan signal is supplied to the ith scan signal Si, thereby supplying the voltage of the initialization power source Vint to the anode electrode of the organic light emitting diode OLED.

The storage capacitor Cst is coupled between the first power source ELVDD and the first node N1. The storage capacitor Cst stores a voltage corresponding to the data signal and the threshold voltage of the first transistor T1.

Figure 14:
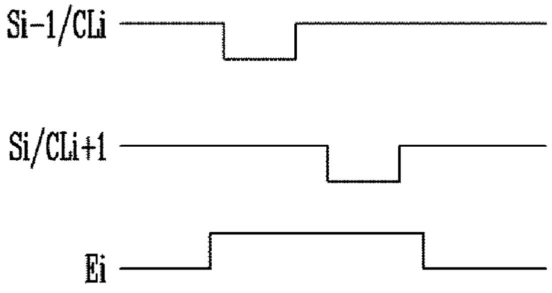
FIGS. 14 and 15 illustrate timing diagrams corresponding to a driving method of the pixel shown in FIG. 13 according to an exemplary embodiment of the present disclosure.
Figure 15:
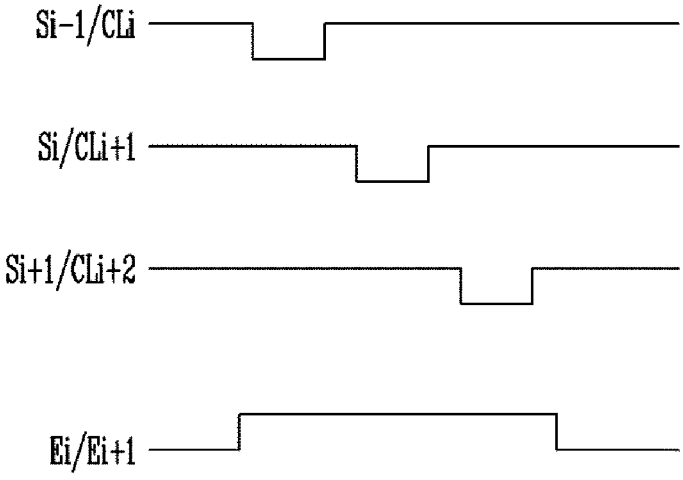

FIGS. 14 and 15 illustrate timing diagrams corresponding to a driving method of the pixel shown in FIG. 13 according to an exemplary embodiment of the present disclosure.

First, referring to FIG. 14, an emission control signal having a gate-off voltage is supplied to the ith emission control line Ei during each frame period. When the emission control signal is supplied to the ith emission control line Ei, the fifth transistor T5 and the sixth transistor T6 of the pixel PXL disposed on the ith horizontal line are turned off. Accordingly, the pixel PXL is set to a non-emission state.

Subsequently, when a scan signal is supplied to the ith initialization control line CLi (e.g., the (i−1)th scan line Si−1), the fourth transistor T4 of the pixel PXL disposed on the ith horizontal line is turned on. When the fourth transistor T4 is turned on, the voltage of the initialization power source Vint is supplied to the first node N1. Then, the first node N1 is initialized to the voltage of the initialization power source Vint.

After the first node N1 is initialized to the voltage of the initialization power source Vint, a scan signal is supplied to the ith scan line Si. When the scan signal is supplied to the ith scan line Si, the second transistor T2, the third transistor T3, and the seventh transistor T7 of the pixel PXL disposed on the ith horizontal line are turned on.

When the seventh transistor T7 is turned on, the voltage of the initialization power source Vint is supplied to the anode electrode of the organic light emitting diode OLED. Then, a parasitic capacitor structurally formed in the organic light emitting diode OLED is discharged, and accordingly, the ability to accurately display a black gray scale is enhanced.

For example, the parasitic capacitor of the organic light emitting diode OLED is charged with a predetermined voltage corresponding to a current supplied in a previous frame period. When a black gray scale is to be displayed in a current frame, the organic light emitting diode OLED is to maintain the non-emission state during the corresponding frame period. However, when the parasitic capacitor of the organic light emitting diode OLED maintains a charged state, light may be easily emitted from the organic light emitting diode OLED by a small leakage current.

Alternatively, when the parasitic capacitor of the organic light emitting diode OLED is charged before each pixel PXL emits light, the leakage current of the first transistor T1 first charges the parasitic capacitor of the organic light emitting diode OLED. Accordingly, the organic light emitting diode OLED can stably maintain the non-emission state during a frame period in which the corresponding pixel PXL displays the black gray scale.

When the third transistor T3 is turned on, the first transistor T1 is diode-coupled.

When the second transistor T2 is turned on, a data signal supplied through the data line Dj of the corresponding pixel PXL is transferred to the first electrode of the first transistor T1. At this time, since the first node N1 is initialized to the voltage of the initialization power source Vint, which is lower than the lowest voltage of the data signal, the first transistor T1 is turned on. When the first transistor T1 is turned on, a voltage obtained by subtracting the threshold voltage of the first transistor T1 from the data signal is applied to the first node N1. Accordingly, the storage capacitor Cst stores a voltage corresponding to the data signal applied to the first node N1 and the threshold voltage of the first transistor T1.

After the voltage corresponding to the data signal and the threshold voltage of the first transistor T1 is stored in the storage capacitor Cst, the supply of the emission control signal to the ith emission control line Ei is stopped. Therefore, the voltage of the ith emission control line may be changed to a gate-on voltage.

When the voltage of the ith emission control line Ei is changed to the gate-on voltage, the fifth transistor T5 and the sixth transistor T6 are turned on. Then, a current path of a driving current flowing from the first power source ELVDD to the second power source ELVSS via the fifth transistor T5, the first transistor T1, the sixth transistor T6, and the organic light emitting diode OLED is formed. At this time, the first transistor T1 controls an amount of driving current flowing through the organic light emitting diode OLED corresponding to the voltage of the first node N1. Then, the organic light emitting diode OLED emits light with a luminance corresponding to the amount of driving current.

The pixel PXL generates light with a luminance corresponding to the data signal while repeating the above-described process. It is to be understood that the pixel structure of the pixel PXL (e.g., the structure of the pixel circuit PXC) and the driving method thereof are not limited to the exemplary embodiment described with reference to FIGS. 13 and 14, and may be variously modified and implemented.

An ith emission control signal supplied to the ith emission control line Ei is supplied to overlap with an ith scan signal. As a result, pixels PXL disposed on the ith horizontal line can maintain the non-emission state during a period in which the data signal is transferred to and stored in the pixels PXL. In addition, the ith emission control signal may be supplied to overlap with an ith initialization control signal (or an (i−1)th scan signal). As a result, pixels PXL disposed on the ith horizontal line can maintain the non-emission state during a period in which the pixels PXL are initialized. The supply timing of the emission control signal may be set using various methods.

Further, in exemplary embodiments, the emission of pixels PXL disposed on a plurality of horizontal lines may be simultaneously controlled. For example, an emission control signal may be simultaneously supplied to pixels PXL disposed on two consecutive horizontal lines for every two consecutive horizontal lines. As an example, the ith emission control line Ei and an (i+1)th emission control line Ei+1 may be coupled to each other to be implemented as one substantially integrated emission control line.

When the ith and (i+1)th emission control lines Ei and Ei+1 are coupled to each other, an emission control signal supplied to the ith and (i+1)th emission control lines Ei and Ei+1, as shown in FIG. 15, may overlap with an initialization control signal (e.g., an (i−1)th scan signal) supplied to at least the ith initialization control line CLi (e.g., the (i−1)th scan line Si−1), the scan signal supplied to the ith scan line Si, an initialization control signal (e.g., an ith scan signal) supplied to an (i+1) the initialization control line CLi+1 (e.g., the ith scan line Si), and the scan signal supplied to the (i+1)th scan line Si+1. The (i+1)th scan line Si+1 may be coupled to an (i+2)th initialization power line CLi+2. In this case, an (i+1)th scan signal supplied to the (i+1)th scan line Si+1 may be used as an (i+2)th initialization control signal for initializing pixels PXL disposed on an (i+2) the horizontal line. Implementation of the exemplary embodiment described herein results in the simplification of the structure of an emission control driver for supplying an emission control signal to the pixels PXL. For example, the number of emission control stages provided in the emission control driver can be decreased to about a half according to exemplary embodiments of the present disclosure. Herein, an emission control driver may also be referred to as an emission control driver circuit.

Figure 16:
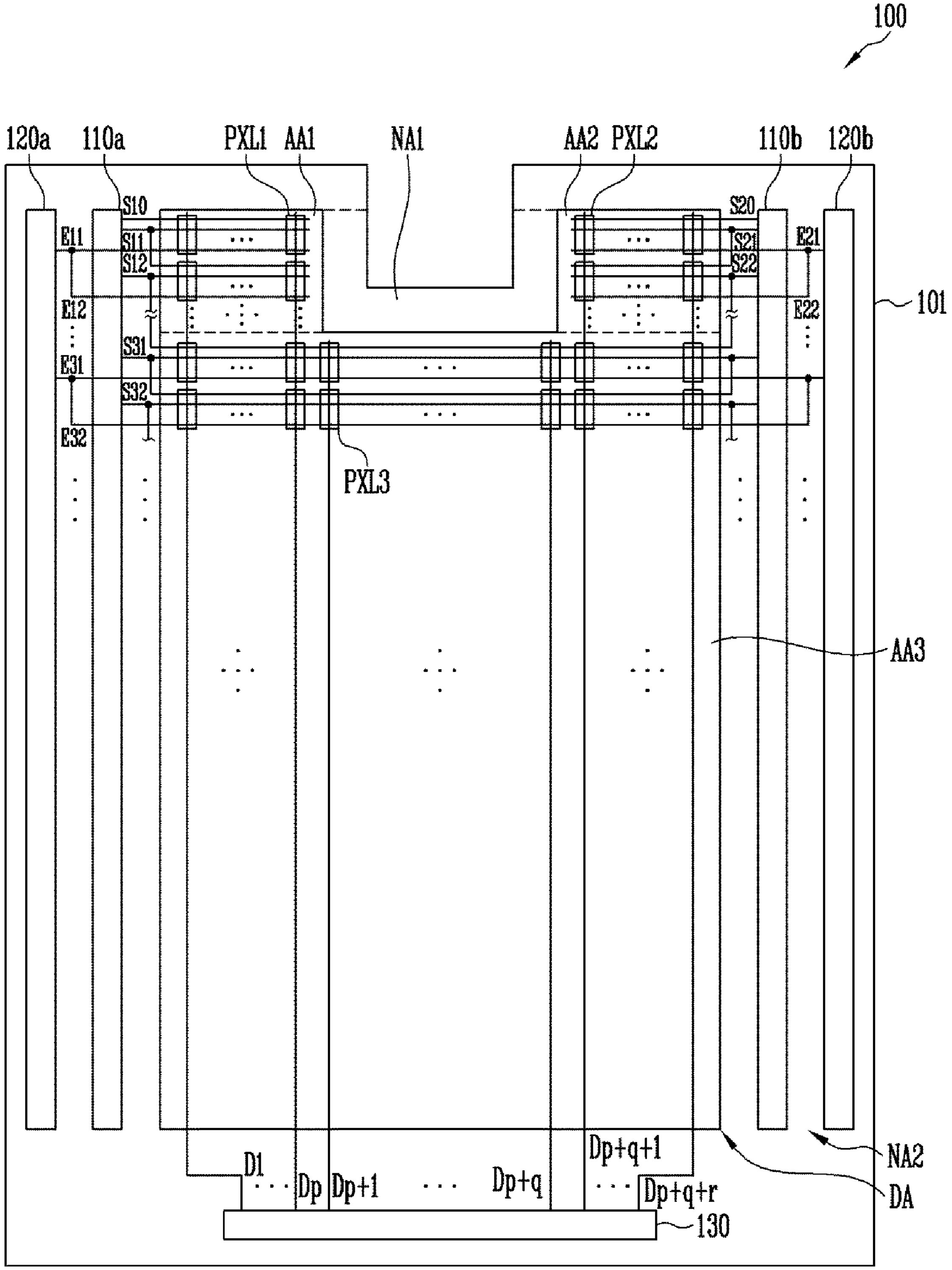
FIG. 16 illustrates a display panel according to an exemplary embodiment of the present disclosure.

FIG. 16 illustrates a display panel according to an exemplary embodiment of the present disclosure. For example, FIG. 16 illustrates an exemplary embodiment related to the structure of a display panel that may be provided in a display device according to an exemplary embodiment of the present disclosure. In FIG. 16, components similar or identical to those of FIGS. 1 to 12 are designated by like reference numerals, and a further detailed description thereof will be omitted.

Referring to FIG. 16, in an exemplary embodiment, the display panel 100 includes a display region DA in which a plurality of pixels (e.g., first, second, and third pixels PXL1, PXL2, and PXL3) that display an image, and at least one driver that drives the display region DA, are disposed. As an example, the display panel 100 may include at least one driver among first and second scan drivers 110*a* and 110*b*, first and second emission control drivers 120*a* and 120*b*, and a data driver 130, in addition to the display region DA. However, exemplary embodiments of the present disclosure are not limited thereto. For example, in an exemplary embodiment of the present disclosure, the above-described drivers 110*a*, 110*b*, 120*a*, 120*b*, and 130 may all be disposed at the outside of the display panel 100, and may be electrically coupled to the pixels PXL1, PXL2, and PXL3 of the display region DA through at least one pad unit and/or at least one circuit board.

In exemplary embodiments, the display region DA includes first, second, and third pixel regions AA1, AA2, and AA3. In addition, the first and second pixel regions AA1 and AA2 may be spaced apart from each other with a first non-pixel region NA1 interposed therebetween.

The first pixel region AA1 includes first pixels PXL1, and first gate control lines and data lines D1 to Dp (p is a natural number), which are coupled to the first pixels PXL1. Here, the first gate control lines refer to control lines for controlling driving of the first pixels PXL1. For example, the first gate control lines may include at least some of first scan lines S10, S11, S12, . . . , first initialization control lines (e.g., first scan lines on a directly adjacent previous horizontal line), and first emission control lines E11, E12, . . . , which control driving timings of the first pixels PXL1.

As an example, a first group of the first horizontal pixels PXL1, and a tenth scan line S10, an eleventh scan line S11, and an eleventh emission control line E11, which supply an initialization control signal (or previous scan signal), a scan signal (or current scan signal), and an emission control signal to each of the pixels in the first group of the first horizontal pixels PXL1, may be disposed on a first horizontal line of the first pixel region AA1. In addition, a second group of the first horizontal pixels PXL1, and the eleventh scan line S11, a twelfth scan line S12, and a twelfth emission control line E12, which supply an initialization control signal (or previous scan signal), a scan signal (or current scan signal), and an emission control signal to each of the pixels in the second group of the first horizontal pixels PXL1, may be disposed on a second horizontal line of the first pixel region AA1.

In exemplary embodiments, each initialization control line for initialization of the first pixels PXL1 may be coupled to and/or integrated with a current scan line of a previous horizontal line. However, exemplary embodiments of the present disclosure are not limited thereto. Further, in exemplary embodiments, the first emission control lines E11, E12, . . . may form a pair for every at least two first emission control lines to be coupled to and/or integrated with each other. However, exemplary embodiments of the present disclosure are not limited thereto. The type and/or number of control lines included in the first gate control lines may be variously changed depending on the structure of the first pixels PXL1.

The first non-pixel region NA1 is disposed at one side of the first pixel region AA1. No pixels are disposed in the first non-pixel region NA1, and therefore, the first non-pixel region NA1 may be set as a non-display region.

The second pixel region AA2 is disposed at one side of the first non-pixel region NA1. For example, the second pixel region AA2 and the pixel region AA1 may be disposed adjacent to each other with the first non-pixel region NA1 interposed therebetween.

The second pixel region AA2 includes second pixels PXL2, and second gate control lines and data lines Dp+q+1 to Dp+q+r (p, q, and r are natural numbers), which are coupled to the second pixels PXL2. Here, the second gate control lines refer to control lines that control driving the second pixels PXL2. For example, the second gate control lines may include at least some of second scan lines S20, S21, S22, . . . , second initialization control lines (e.g., second scan lines on a directly adjacent previous horizontal line), and second emission control lines E21, E22, . . . , which control driving timings of the second pixels PXL2. As an example, a first group of second horizontal pixels PXL2, and a twentieth scan line S20, a twenty-first scan line S21, and a twenty-first emission control line E21, which supply an initialization control signal (or previous scan signal), a scan signal (or current scan signal), and an emission control signal to each of the pixels in the first group of the second horizontal pixels PXL2, may be disposed on a first horizontal line of the second pixel region AA2. In addition, a second group of the second horizontal pixels PXL2, and the twenty-first scan line S21, a twenty-second scan line S22, and a twenty-second emission control line E22, which supply an initialization control signal (or previous scan signal), a scan signal (or current scan signal), and an emission control signal to each of the pixels in the second group of the second horizontal pixels PXL2, may be disposed on a second horizontal line of the second pixel region AA2.

In exemplary embodiments, each initialization control line that initializes the second pixels PXL2 may be coupled to and/or integrated with a current scan line of a previous horizontal line. However, exemplary embodiments of the present disclosure are not limited thereto. Further, in exemplary embodiments, the second emission control lines E21, E22, . . . may form a pair for every at least two first emission control lines to be coupled to and/or integrated with each other. However, exemplary embodiments of the present disclosure are not limited thereto. The type and/or number of control lines included in the second gate control lines may be variously changed depending on the structure of the second pixels PXL2.

The third pixel region AA3 is disposed at one side of the first and second pixel regions AA1 and AA2 and the first non-pixel region NA1. For example, the third pixel region AA3 may be disposed at a lower end of the first and second pixel regions AA1 and AA2 and the first non-pixel region NA1.

The third pixel region AA3 includes third pixels PXL3, and third gate control lines and the data lines D1 to Dp+q+r. Here, the third gate control lines refer to control lines that control driving of the third pixels PXL3. For example, the third gate control lines may include at least some of the third scan lines S31, S32, . . . , third initialization control lines (e.g., the last first and second scan lines of the first and second pixel regions AA1 and AA2, or third scan lines of a directly adjacent previous horizontal line), and third emission control lines E31, E32, . . . , which control driving timings of the third pixels PXL3.

In exemplary embodiments, each initialization control line that initializes the third pixels PXL3 may be coupled to and/or integrated with a current scan line of a previous horizontal line. However, exemplary embodiments of the present disclosure are not limited thereto. Further, in exemplary embodiments, the third emission control lines E31, E32, . . . may form a pair for every at least two first emission control lines to be coupled to and/or integrated with each other. However, exemplary embodiments of the present disclosure are not limited thereto. The type and/or number of control lines included in the third gate control lines may be variously changed depending on the structure of the third pixels PXL3.

The first scan driver 110*a* may be disposed at one side of the first pixel region AA1 and the third pixel region AA3. As an example, the first scan driver 110*a* may be disposed at a left side of the first pixel region AA1 and the third pixel region AA3. The first scan driver 110*a* sequentially supplies a scan signal to the first scan lines S10, S11, S12, . . . and the third scan lines S31, S32, . . . .

The second scan driver 110*b* may be disposed at one side of the second pixel region AA2 and the third pixel region AA3. As an example, the second scan driver 110*b* may be disposed at a right side of the second pixel region AA2 and the third pixel region AA3. The second scan driver 110*b* sequentially supplies a scan signal to the second scan lines S20, S21, S22, . . . and the third scan lines S31, S32, . . . .

In exemplary embodiments, the second scan driver 110*b* may supply a scan signal to the second scan lines S20, S21, S22, . . . to be synchronized with the time when a scan signal is supplied to the first scan lines S10, S11, S12, . . . . That is, the first and second pixel regions AA1 and AA2 may be simultaneously scanned.

The first emission control driver 120*a* may be disposed at one side of the first pixel region AA1 and the third pixel region AA3. As an example, the first emission control driver 120*a* may be disposed at a left side of the first pixel region AA1 and the third pixel region AA3. The first emission control driver 120*a* sequentially supplies an emission control signal to the first emission control lines E11, E12, . . . and the third emission control lines E31, E32, . . . .

The second emission control driver 120*b* may be disposed at one side of the second pixel region AA2 and the third pixel region AA3. As an example, the second emission control driver 120*b* may be disposed at a right side of the second pixel region AA2 and the third pixel region AA3. The second emission control driver 120*b* sequentially supplies an emission control signal to the second emission control lines E21, E22, . . . and the third emission control lines E31, E32, . . . .

In exemplary embodiments, the second emission control driver 120*b* may supply an emission control signal to the second emission control lines E21, E22, . . . to be synchronized with the time when an emission control signal is supplied to the first emission control lines E11, E12, . . . . That is, the first and second pixel regions AA1 and AA2 may be simultaneously driven. In exemplary embodiments, the first and second emission control drivers 120*a* and 120*b* may be omitted according to the structure of the pixels PXL1, PXL2, and PXL3 arranged in the display region DA and/or the driving method thereof.

The data driver 130 is supplied with image data from the outside (e.g., a timing controller, etc.), and generates a data signal corresponding to the image data. The data driver 130 supplies a data signal to the data lines D1 to Dp+q+r for every horizontal period to be synchronized with the scan signal supplied to the first and second scan lines S10, S11, S12, . . . and S20, S21, S22, . . . and the third scan lines S31, S32, . . . .

Figure 17:
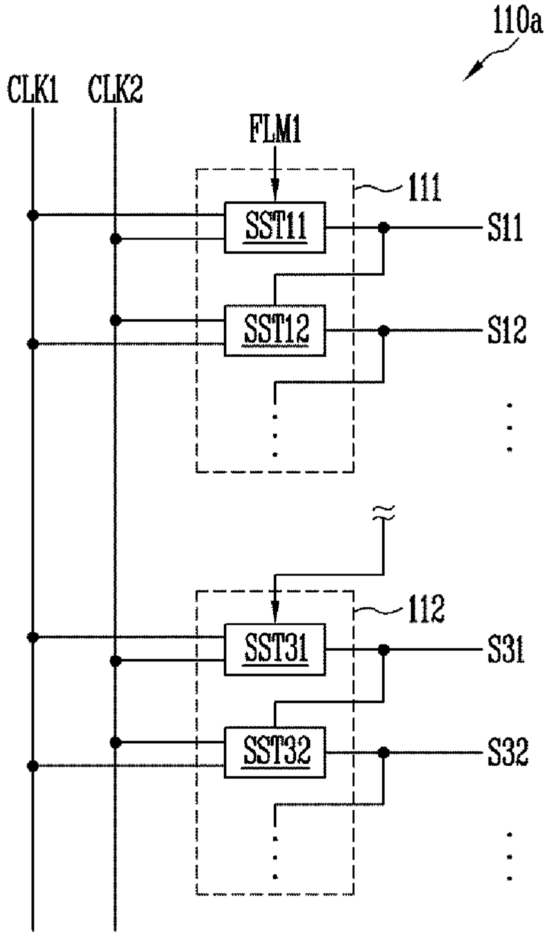
FIGS. 17 and 18 respectively illustrate first and second scan drivers shown in FIG. 16 according to exemplary embodiments of the present disclosure.
Figure 18:
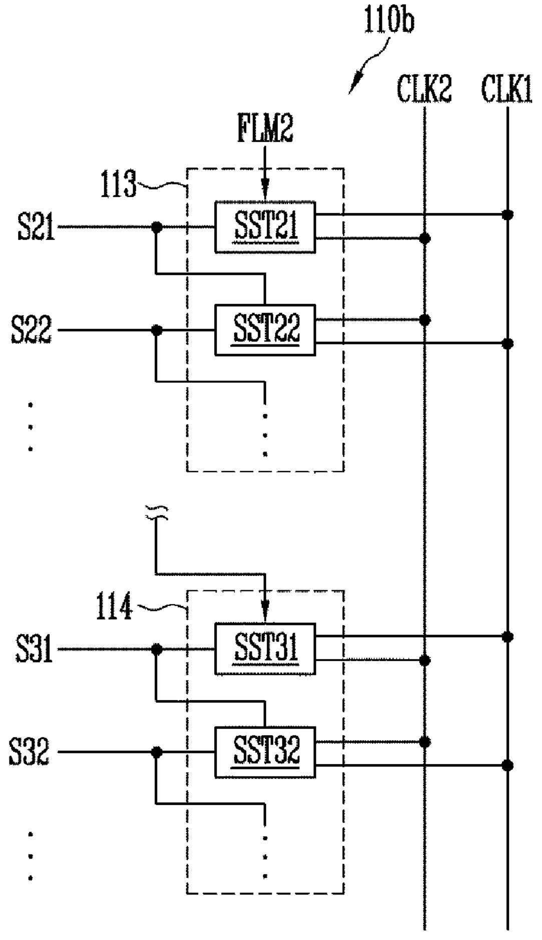

FIGS. 17 and 18 respectively illustrate the first and second scan drivers shown in FIG. 16 according to exemplary embodiments of the present disclosure. In FIGS. 17 and 18, an exemplary embodiment in which each of the first and second scan drivers is driven by two clock signals is disclosed. However, exemplary embodiments of the present disclosure are not limited thereto. For example, in exemplary embodiments, the number and/or type of clock signals for driving the first and second scan drivers may be changed.

First, referring to FIG. 17, in an exemplary embodiment, the first scan driver 110*a* includes a first sub-scan driver 111 and a second sub-scan driver 112. For convenience of explanation, an exemplary embodiment in which the second sub-scan driver 112 uses an output signal of the first sub-scan driver 111 (e.g., a current scan signal supplied to the last horizontal line of the first pixel region AA1) as a start signal is illustrated in FIG. 17. However, exemplary embodiments of the present disclosure are not limited thereto. For example, in an exemplary embodiment of the present disclosure, the second sub-scan driver 112 may be supplied with a separate start signal to be driven.

The first sub-scan driver 111 includes a plurality of first scan stages SST11, SST12, . . . . The first sub-scan driver 111 sequentially supplies a scan signal to the first scan lines S11, S12, . . . using a first start signal FLM1 and first and second clock signals CLK1 and CLK2. In exemplary embodiments, when at least one initialization control line (e.g., the tenth scan line S10) for initialization of the first pixels PXL1 disposed on the first horizontal line of the first pixel region AA1 is further provided, the first sub-scan driver 111 may further include at least one first scan stage for supplying a scan signal (or initialization control signal) to the tenth scan line S10 before a scan signal is supplied to the eleventh scan line S11.

The second sub-scan driver 112 includes a plurality of third scan stages SST31, SST32, . . . . The second sub-scan driver 112 subsequently supplies a scan signal to the third scan lines S31, S32, . . . , using the output signal of the first sub-scan driver 111 (e.g., the current scan signal supplied to the last horizontal line of the first pixel region AA1) (or the separate start signal) and the first and second clock signals CLK1 and CLK2.

Referring to FIG. 18, in an exemplary embodiment, the second scan driver 110*b* includes a third sub-scan driver 113 and a fourth sub-scan driver 114. For convenience of explanation, an exemplary embodiment in which the fourth sub-scan driver 114 uses an output signal of the third sub-scan driver 113 (e.g., a current scan signal supplied to the last horizontal line of the second pixel region AA2) as a start signal is illustrated in FIG. 18. However, exemplary embodiments of the present disclosure are not limited thereto. For example, in an exemplary embodiment of the present disclosure, the fourth sub-scan driver 114 may be supplied with a separate start signal to be driven.

The third sub-scan driver 113 includes a plurality of second scan stages SST21, SST22, . . . . The third sub-scan driver 113 sequentially supplies a scan signal to the second scan lines S21, S22, . . . using a second start signal FLM2 and the first and second clock signals CLK1 and CLK2. In exemplary embodiments, the second start signal FLM2 may be supplied to be synchronized with the first start signal FLM1. In exemplary embodiments, when at least one initialization control line (e.g., the twentieth scan line S20) for initialization of the second pixel PXL2 disposed on the first horizontal line of the second pixel region AA2 is further provided, the third sub-scan driver 113 may further include at least one second scan stage for supplying a scan signal (or initialization control signal) to the twentieth scan line S20 before a scan signal is supplied to the twenty-first scan line S21.

The fourth sub-scan driver 114 includes a plurality of third scan stages SST31, SST32, . . . . The fourth sub-scan driver 114 sequentially supplies a scan signal to the third scan lines S31, S32, . . . using the output signal of the third sub-scan driver 113 (e.g., the current scan signal supplied to the last horizontal line of the second pixel region AA2) (or the separate start signal) and the first and second clock signals CLK1 and CLK2. In exemplary embodiments, the third scan stages SST31, and SST32, . . . provided in the second and fourth sub-scan drivers 112 and 114 may have substantially the same configuration, and thus, may be driven in synchronization with each other.

In an exemplary embodiment of the present disclosure, the configuration of the first to third scan stages SST11, SST12, SST21, SST22, . . . , and SST31, SST32, . . . is not particularly limited. That is, the first to third scan stages SST11, SST12, SST21, SST22, and SST31, SST32, . . . may be implemented with various types of scan stage circuits.

Figure 19:
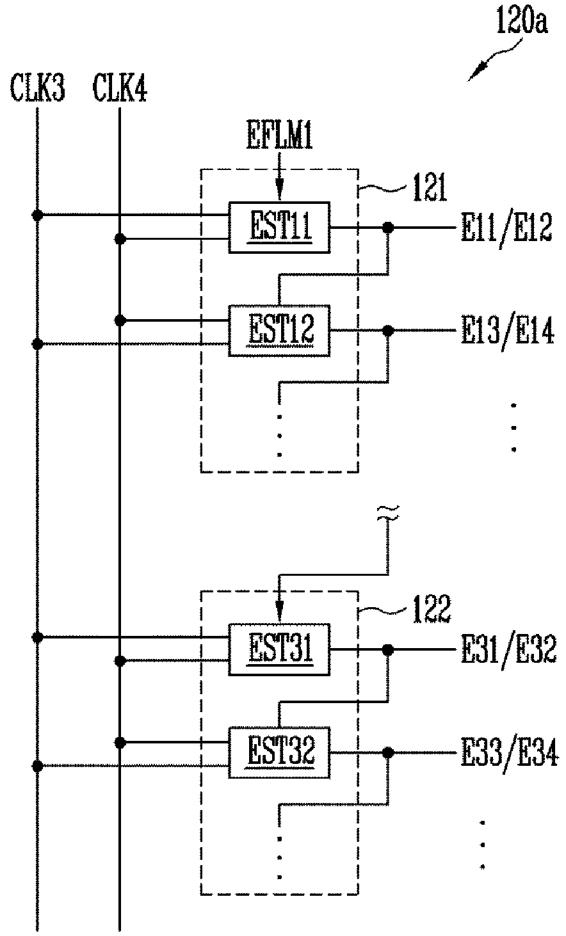
FIGS. 19 and 20 respectively illustrate first and second emission control drivers shown in FIG. 16 according to exemplary embodiments of the present disclosure.
Figure 20:
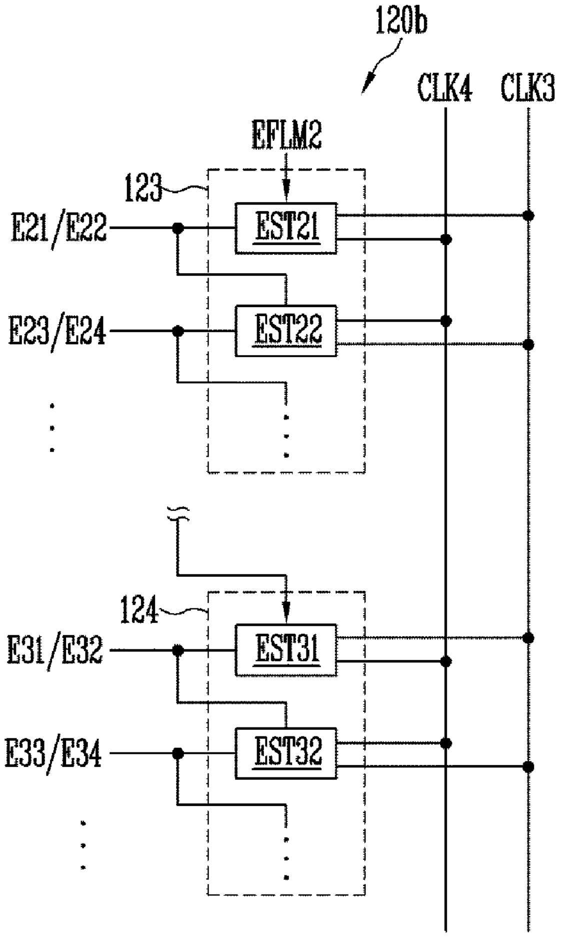

FIGS. 19 and 20 respectively illustrate the first and second emission control drivers shown in FIG. 16 according to exemplary embodiments of the present disclosure. In FIGS. 19 and 20, an exemplary embodiment in which each of the first and second scan drivers is driven by two clock signals is disclosed. However, exemplary embodiments of the present disclosure are not limited thereto. For example, the number and/or type of clock signals for driving the first and second scan drivers may be changed.

First, referring to FIG. 19, in an exemplary embodiment, the first emission control driver 120*a* includes a first sub-emission control driver 121 and a second sub-emission control driver 122. For convenience of explanation, an exemplary embodiment in which the second sub-emission control driver 122 uses an output signal of the first sub-emission control driver 121 (e.g., an emission control signal supplied to the last horizontal line of the first pixel region AA1) as a start signal is illustrated in FIG. 19. However, exemplary embodiments of the present disclosure are not limited thereto. For example, in an exemplary embodiment of the present disclosure, the second sub-emission control driver 122 may be supplied with a separate start signal to be driven. The first sub-emission control driver 121 includes a plurality of first emission control stages EST11, EST12, . . . . The first sub-emission control driver 121 sequentially supplies an emission control signal to the first emission control lines E11, E12, E13, E14, . . . using a third start signal EFLM1 and third and fourth clock signals CLK3 and CLK4. In exemplary embodiments, when the first emission control lines E11, E12, E13, E14, . . . form a pair for every plurality of, for example, two first emission control lines to be coupled to each other, the first sub-emission control driver 121 may sequentially supply an emission control signal to the pairs of first emission control lines E11 and E12, E13 and E14, The second sub-emission control driver 122 includes a plurality of third emission control stages EST31, EST32, . . . . The second sub-emission control driver 122 sequentially supplies an emission control signal to the third emission control lines E31, E32, E33, E34, . . . using the output signal of the first sub-emission control driver 121 (e.g., the emission control signal supplied to the last horizontal line of the first pixel region AA1) (or the separate start signal) and the third and fourth clock signals CLK3 and CLK4. In exemplary embodiments, when the third emission control lines E31, E32, E33, E34, . . . form a pair for every plurality of, for example, two third emission control lines to be coupled to each other, the second sub-emission control driver 122 may sequentially supply an emission control signal to the pairs of third emission control lines E31 and E32, E33 and E34, Referring to FIG. 20, in an exemplary embodiment, the second emission control driver 120*b* includes a third sub-emission control driver 123 and a fourth sub-emission control driver 124. For convenience of explanation, an exemplary embodiment in which the fourth sub-emission control driver 124 uses an output signal of the third sub-emission control driver 123 (e.g., an emission control signal supplied to the last horizontal line of the second pixel region AA2) as a start signal is illustrated in FIG. 20. However, exemplary embodiments of the present disclosure are not limited thereto. For example, in an exemplary embodiment of the present disclosure, the fourth sub-emission control driver 124 may be supplied with a separate start signal to be driven.

The third sub-emission control driver 123 includes a plurality of second emission control stages EST21, EST22, . . . . The third sub-emission control driver 123 sequentially supplies an emission control signal to the second emission control lines E21, E22, E23, E24, using a fourth start signal EFLM2 and the third and fourth clock signals CLK3 and CLK4. In exemplary embodiments, the fourth start signal EFLM2 may be supplied to be synchronized with the third start signal EFLM1. When the second emission control lines E21, E22, E23, E24, form a pair for every plurality of, for example, two second emission control lines to be coupled to each other, the third sub-emission control driver 123 may sequentially supply an emission control signal to the pairs of second emission control lines E21 and E22, E23 and E24, . . . .

The fourth sub-emission driver 124 includes a plurality of third emission control stages EST31, EST32, . . . . The fourth sub-emission control driver 124 sequentially supplies an emission control signal to the third emission control lines E31, E32, E33, E34, . . . using the output signal of the third sub-emission control driver 123 (e.g., the emission control signal supplied to the last horizontal line of the second pixel region AA2) (or the separate start signal). In exemplary embodiments, when the third emission control lines E31, E32, E33, E34, . . . form a pair for every plurality of, for example, two third emission control lines to be coupled to each other, the fourth sub-emission control driver 124 may sequentially supply an emission control signal to the pairs of third emission control lines E31 and E32, E33 and E34, In exemplary embodiments, the third emission control stages SST31, SST32, . . . provided in the second and fourth sub-emission control drivers 122 and 124 may have substantially the same configuration, and thus, may be driven in synchronization with each other.

In an exemplary embodiment of the present disclosure, the configuration of the first to third emission control stages EST11, EST12, EST21, EST22, . . . , and EST31, EST32, . . . is not particularly limited. For example, the first to third emission control stages EST11, EST12, EST21, EST22, . . . , and EST31, EST32, . . . may be implemented with various types of emission control stages.

According to the exemplary embodiments shown in FIGS. 16 to 20, the plurality of scan drivers 110*a* and 110*b* and the plurality of emission control drivers 120*a* and 120*b* are provided so that the display region DA can be smoothly driven even when the first gate control lines and the second gate control lines are separated from each other. However, in the above-described exemplary embodiments, a plurality of scan stages SST and/or a plurality of emission control stages EST are provided so as to drive one horizontal line. Therefore, a limitation in reducing the area of the second non-pixel region NA2 may occur.

Figure 21:
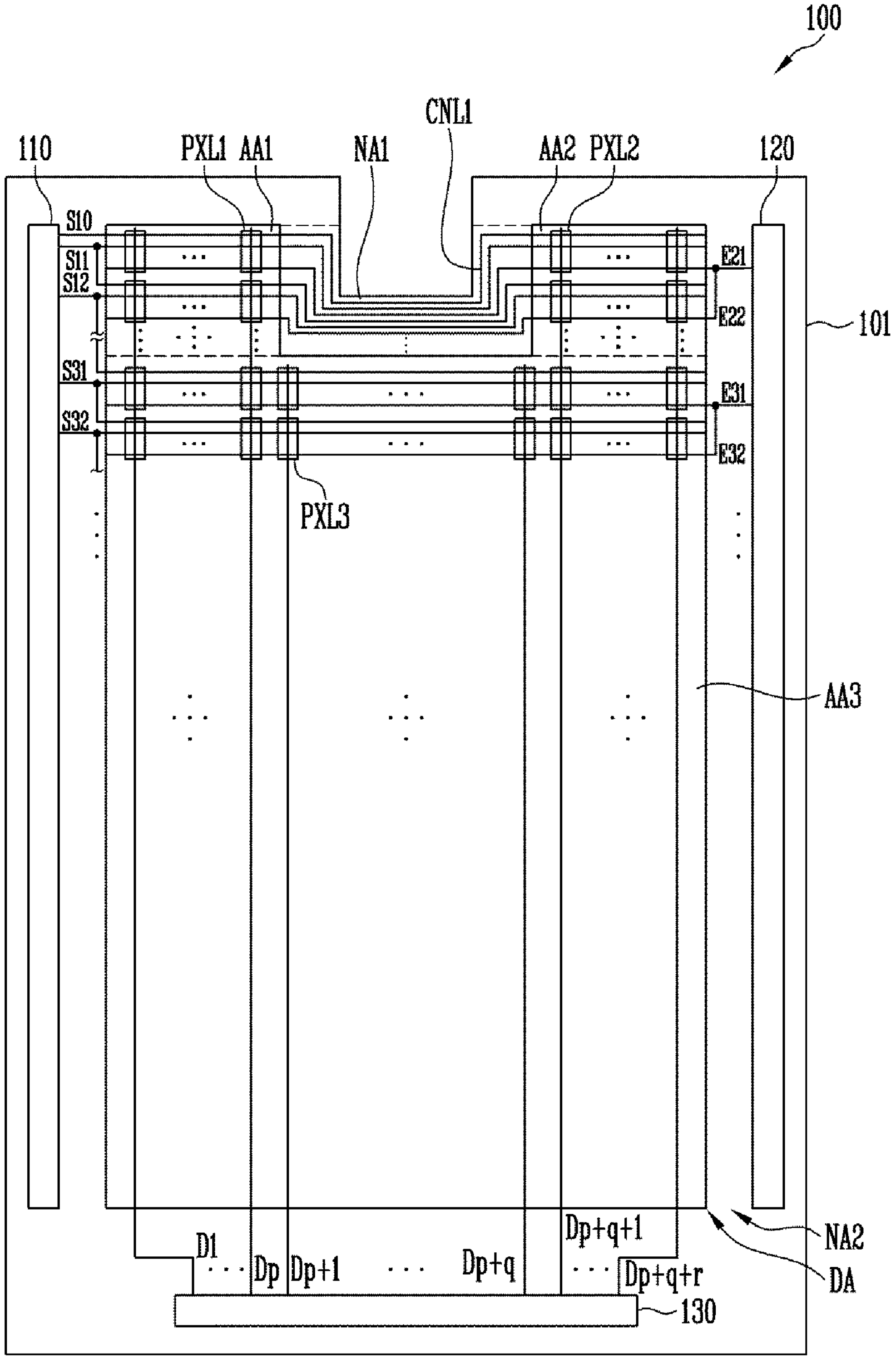
FIGS. 21 and 22 each illustrates a display panel according to an exemplary embodiment of the present disclosure.
Figure 22:
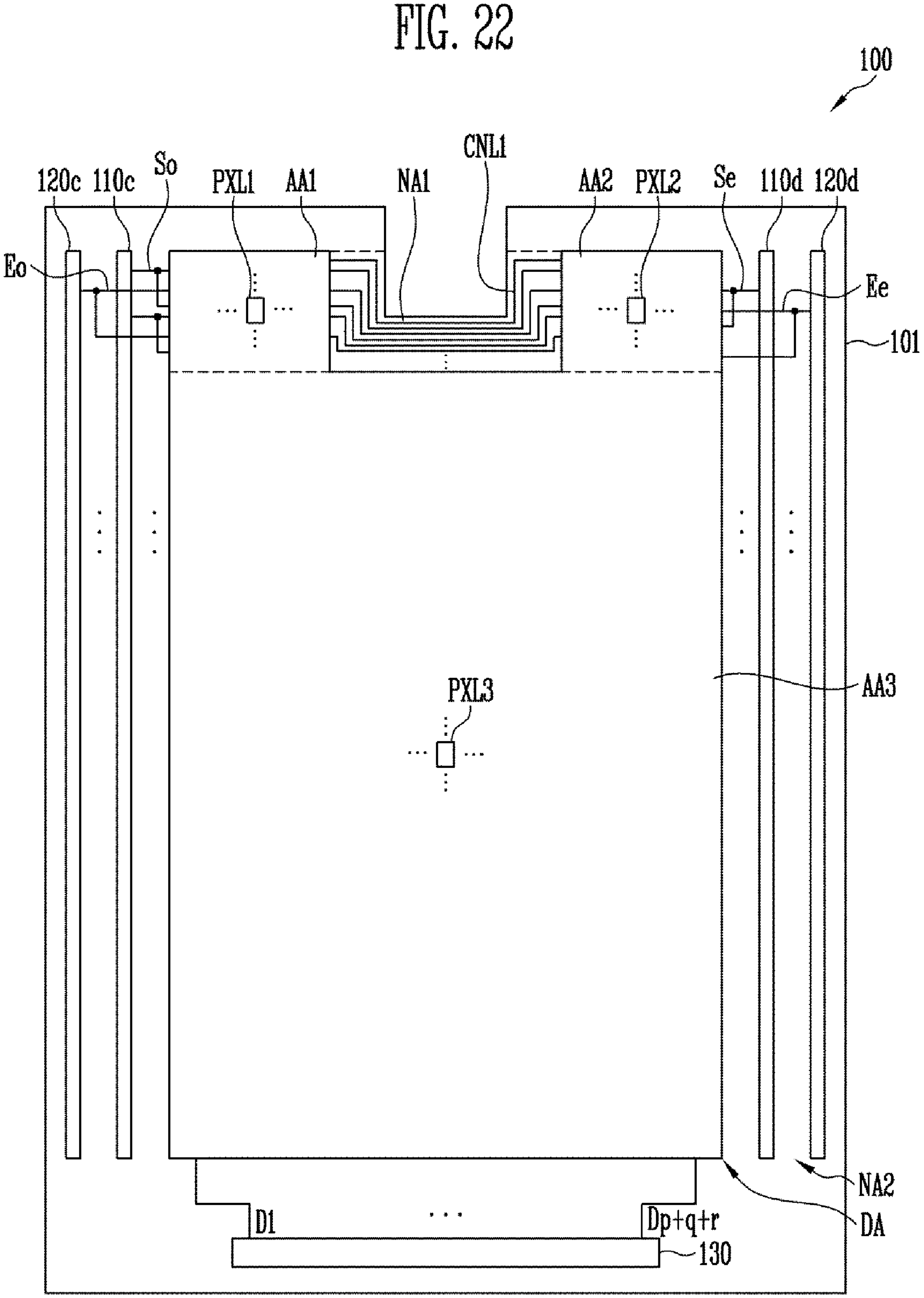

FIGS. 21 and 22 each illustrates a display panel according to an exemplary embodiment of the present disclosure. In FIGS. 21 and 22, components similar or identical to those of FIG. 16 are designated by like reference numerals, and a further detailed description thereof will be omitted.

First, referring to FIG. 21, in an exemplary embodiment, the first and second scan drivers 110*a* and 110*b* described in the above-described exemplary embodiments are integrated as one scan driver 110. For example, the integrated scan driver 110 may be disposed at any one side (e.g., a left side) of the display region DA, and sequentially drives the first, second, and third scan lines S10/S20, S11/S21, S12/S22, . . . , S31, S32, . . . in units of horizontal lines of the display region DA.

In addition, the first and second emission control drivers 120*a* and 120*b* described in the above-described exemplary embodiments may also be integrated as one emission control driver 120. For example, the integrated emission control driver 120 may be disposed at any one side (e.g., a right side) of the display region DA, and sequentially drives the first, second, and third emission control lines E11/E21, E12/E22, E31, E32, . . . in units of horizontal lines of the display region DA. The emission control driver 120 may be disposed at the same one side as the scan driver 110, or may be disposed at one side different from that of the scan driver 110. As an example, the scan driver 110 may be disposed at a left side of the display region DA, and the emission control driver 120 may be disposed at a right side of the display region DA, as illustrated in FIG. 21.

First coupling lines CNL1 may be disposed in the first non-pixel region NA1 so as to drive the first, second, and third pixel regions AA1, AA2, and AA3, using one scan driver 110 and one emission control driver 120. Here, the first coupling lines CNL1 may connect lines corresponding to each other among the first and second gate lines disposed in the first and second pixel regions AA1 and AA2.

As an example, first initialization control lines (e.g., the tenth scan line S10 and the twentieth scan line S20) disposed on a first horizontal line of the first and second pixel regions AA1 and AA2 may be coupled to each other by any one of the first coupling lines CNL1 (e.g., a first coupling line), and first current scan lines (e.g., the eleventh scan line S11 and the twenty-first scan line S21) disposed on the first horizontal line may be coupled to each other by another one of the first coupling lines CNL1 (e.g., a second first coupling line). In addition, first emission control lines (e.g., the eleventh emission control line E11 and the twenty-first emission control line E21) disposed on the first horizontal line may be coupled to each other by another one of the first coupling lines CNL1 (e.g., a third first coupling line). In this manner, first and second gate control lines disposed on each horizontal line of the first and second pixel regions AA1 and AA2 may be coupled to each other by each of the first coupling lines CNL1.

In exemplary embodiments, each of the scan driver 110 and the emission driver 120 may be disposed to be divided into two blocks. For example, as shown in FIG. 22, an odd-numbered scan stage block 110*c* that supplies a scan signal to odd-numbered scan lines So of the display region DA, and an even-numbered scan stage block 110*d* that supplies a scan signal to even-numbered scan lines Se of the display region DA, may be disposed at different sides of the display region DA. Similarly, an odd-numbered emission control stage block 120*c* that supplies an emission control signal to odd-numbered pairs of emission control lines Eo, and an even-numbered emission control stage block 120*d* that supplies an emission control signal to even-numbered pairs of emission control lines Ee, may be disposed at different sides of the display region DA.

In this case, although each of the scan driver 110 and the emission control driver 120 is divided into two blocks 110*c* and 110*d* or 120*c* and 120*d* to be provided at different sides of the display region DA, the area of a stage circuit provided in the display panel 100 may be substantially similar to that in the exemplary embodiment of FIG. 21. For example, the area of the stage circuit may be decreased to about a half as compared with the exemplary embodiment of FIG. 16.

According to the exemplary embodiments of FIGS. 21 and 22, the area occupied by a driving circuit in the display panel 100 is decreased, and accordingly, the area of the second non-pixel region NA2 can be reduced. However, in the above-described exemplary embodiments, the plurality of first coupling lines CNL1 corresponding to the number of first and second gate control lines disposed in the first and second pixel regions AA1 and AA2 is disposed in the first non-pixel region NA1. Therefore, the area of the first non-pixel region NA1 may be increased.

FIGS. 23 to 26 each illustrates one region of a display panel according to an exemplary embodiment of the present disclosure. In FIGS. 23 to 26, the structure of the display panel 100 is illustrated in a manner to highlight main features of each exemplary embodiment. Thus, the illustration and a further description of some components similar or identical to those of the above-described exemplary embodiments will be omitted.

Figure 23:
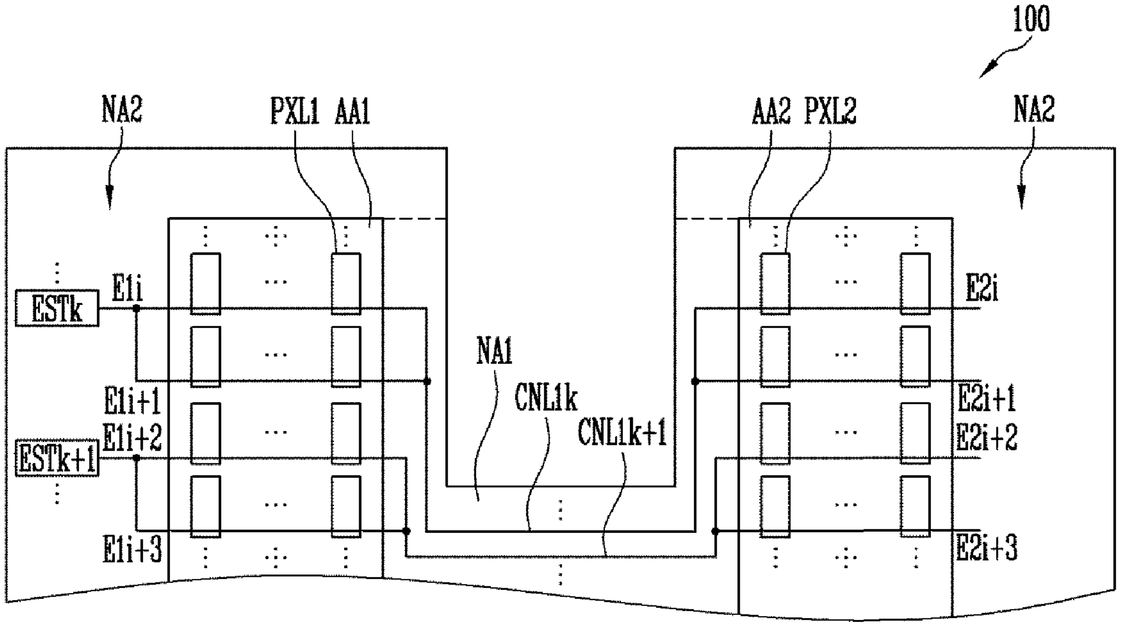
FIGS. 23 to 26 each illustrates one region of a display panel according to an exemplary embodiment of the present disclosure.

First, referring to FIG. 23, in an exemplary embodiment, first emission control lines E1*i*, E1*i*+1, E1*i*+2, and E1*i*+3 are disposed on the respective horizontal lines in the first pixel region AA1. Each of the first emission control lines E1*i*, E1*i*+1, E1*i*+2, and E1*i*+3 may be coupled to at least one first emission control line adjacent thereto.

For example, ith and (i+1)th first emission control lines E1*i* and E1*i*+1 respectively disposed on ith and (i+1)th horizontal lines of the first pixel region AA1 may be coupled to each other to be supplied with the same first emission control signal. As an example, the ith and (i+1)th first emission control lines E1*i* and E1*i*+1 may be commonly coupled to a kth (k is a natural number) emission control stage ESTk, and thus, are simultaneously supplied with a first emission control signal from the kth emission control stage ESTk.

In addition, (i+2)th and (i+3)th first emission control lines E1*i*+2 and E1*i*+3 respectively disposed on (i+2)th and (i+3)th horizontal lines of the first pixel region AA1 may be coupled to each other, and thus, are supplied with the same first emission control signal. As an example, the (i+2)th and (i+3)th first emission control lines E1*i*+2 and E1*i*+3 may be commonly coupled to a (k+1)th emission control stage ESTk+1, and thus, are simultaneously supplied with a first emission control signal from the (k+1)th emission control stage ESTk+1.

Similarly, second emission control lines E2*i*, E2*i*+1, E2*i*+2, and E2*i*+3 are disposed on the respective horizontal lines in the second pixel region AA2. Each of the second emission control lines E2*i*, E2*i*+1, E2*i*+2, and E2*i*+3 may be coupled to at least one second emission control line adjacent thereto. For example, ith and (i+1)th second emission control lines E2*i* and E2*i*+1 respectively disposed on ith and (i+1)th horizontal lines of the second pixel region AA2 may be coupled to each other, and thus, are supplied with the same first emission control signal. In addition, (i+2)th and (i+3)th second emission control lines E2*i*+2 and E2*i*+3 respectively disposed on (i+2)th and (i+3)th horizontal lines of the second pixel region AA2 may be coupled to each other, and thus, are supplied with the same first emission control signal.

In this exemplary embodiment, emission control lines simultaneously driven among the first and second emission control lines E1*i*, E1*i*+1, E1*i*+2, E1*i*+3, E2*i*, E2*i*+1, E2*i*+2, and E2*i*+3 disposed on the respective horizontal lines of the first and second pixel regions AA1 and AA2 are electrically coupled to each other by any one of the first coupling lines CNL1 disposed in the first non-pixel region NA1. For example, the ith and (i+1)th first emission control lines E1*i* and E1*i*+1 respectively disposed on the ith and (i+1)th horizontal lines of the first pixel region AA1, and the ith and (i+1)th second emission control lines E2*i* and E2*i*+1 respectively disposed on the ith and (i+1)th horizontal lines of the second pixel region AA2, may be commonly coupled by a kth first coupling line CNL1*k*. In this case, the ith and (i+1)th first emission control lines E1*i* and E1*i*+1 and the ith and (i+1)th second emission control lines E2*i* and E2*i*+1 may be simultaneously supplied with first and second emission control signals from any one emission control stage such as, for example, the kth emission control stage ESTk provided in the emission control driver 120.

Similarly, the (i+2)th and (i+3)th first emission control lines E1*i*+2 and E1*i*+3 respectively disposed on the (i+2)th and (i+3)th horizontal lines of the first pixel region AA1, and the (i+2)th and (i+3)th second emission control lines E2*i*+2 and E2*i*+3 respectively disposed on the (i+2)th and (i+3)th horizontal lines of the second pixel region AA2, may be coupled by any one of the first coupling lines CNL1. As an example, the (i+2)th and (i+3)th first emission control lines E1*i*+2 and E1*i*+3 and the (i+2)th and (i+3)th second emission control lines E2*i*+2 and E2*i*+3 may be commonly coupled by a (k+1)th first coupling line CNL1*k*+1. In this case, the (i+2)th and (i+3)th first emission control lines E1*i*+2 and E1*i*+3, and the (i+2)th and (i+3)th second emission control lines E2*i*+2 and E2*i*+3, may be simultaneously supplied with first and second emission control signals from any one emission control stage such as, for example, the (k+1)th emission control stage ESTk+1 provided in the emission control driver 120.

Herein, when one coupling line is referred to as commonly coupling at least two gate control lines, it is to be understood that the one coupling line connects the at least two gate control lines to each other. For example, as shown in FIG. 23, the ith and (i+1)th first emission control lines E1*i* and E1*i*+1, and the ith and (i+1)th second emission control lines E2*i* and E2*i*+1, are coupled to the same coupling line (e.g. the kth first coupling line CNL1*k*). Thus, the ith and (i+1)th first emission control lines E1*i* and E1*i*+1 are commonly coupled to the kth first coupling line CNL1*k*, and the ith and (i+1)th second emission control lines E2*i* and E2*i*+1 are commonly coupled to the kth first coupling line CNL1*k*. That is, the kth first coupling line CNL1*k* commonly couples the ith and (i+1)th first emission control lines E1*i* and E1*i*+1 and the ith and (i+1)th second emission control lines E2*i* and E2*i*+1.

Referring to FIGS. 1 and 23, in an exemplary embodiment, a substrate 101 of a display device includes a first protrusion part 101*a*, a second protrusion part 101*a* disposed opposite to the first protrusion part 101*a*, and a notch region 101*b* disposed between the first and second protrusion parts 101*a*. The first pixel region AA1 is disposed on the first protrusion part 101*a*. The first pixel region AA1 includes a first row of first pixels PXL1 and a first gate control line (e.g., E1*i*) coupled to the first row of first pixels PXL1, and a second row of first pixels PXL1 and a second gate control line (e.g., E1*i*+1) coupled to the second row of first pixels PXL1. The second pixel region AA2 is disposed on the second protrusion part 101*a*. The second pixel region AA2 includes a first row of second pixels PXL2 and a third gate control line (e.g., E2*i*) coupled to the first row of second pixels PXL2, and a second row of second pixels PXL2 and a fourth gate control line (e.g., E2*i*+1) coupled to the second row of second pixels PXL2. The first non-pixel region NA1 is disposed in the notch region 101*b*. A first coupling line (e.g., CNL1*k*) is disposed in the first non-pixel region NA1. The first coupling line (e.g., CNL1*k*) is coupled to the first gate control line (e.g., E1*i*), the second gate control line (E1*i*+1), the third gate control line (e.g., E2*i*), and the fourth gate control line (e.g., E2*i*+1).

In the above-described manner, the emission control lines simultaneously driven among the first and second emission control lines E1*i*, E1*i*+1, E1*i*+2, E1*i*+3, E2*i*, E2*i*+1, E2*i*+2, and E2*i*+3 disposed on the respective horizontal lines of the first and second pixel regions AA1 and AA2 are commonly coupled by one first coupling line (e.g., any one of CNL1*k* and CNL1*k*+1) in the non-pixel region NA1. Accordingly, the number of first coupling lines CNL1*k* and CNL1*k*+1 disposed in the first non-pixel region NA1 can be decreased as compared with the exemplary embodiments shown in FIGS. 21 and 22.

An exemplary embodiment in which the emission control stages ESTk and ESTk+1 provided in the emission control driver 120 are sequentially disposed at the same one side of the display region DA (e.g., one side of the first pixel region AA1 or the second pixel region AA2) is disclosed in FIG. 23. However, exemplary embodiments of the present disclosure are not limited thereto. For example, as shown in FIG. 24, in an exemplary embodiment, the emission control stages ESTk and ESTk+1 may be alternately disposed at one side of the first pixel region AA1 and one side of the second pixel region AA2.

Figure 24:
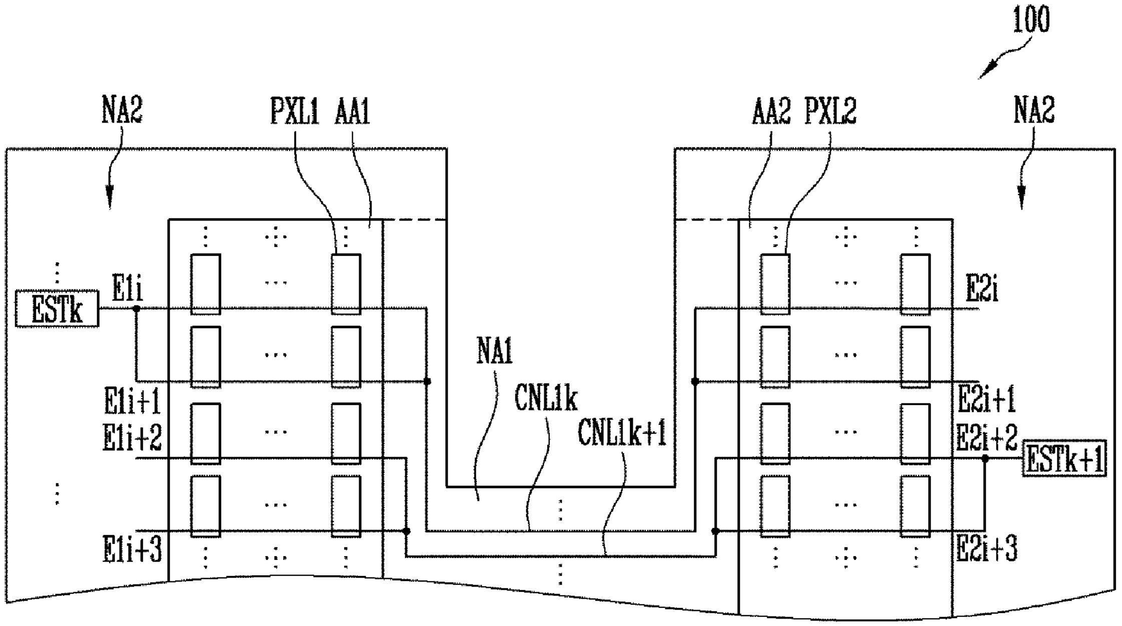
Figure 25:
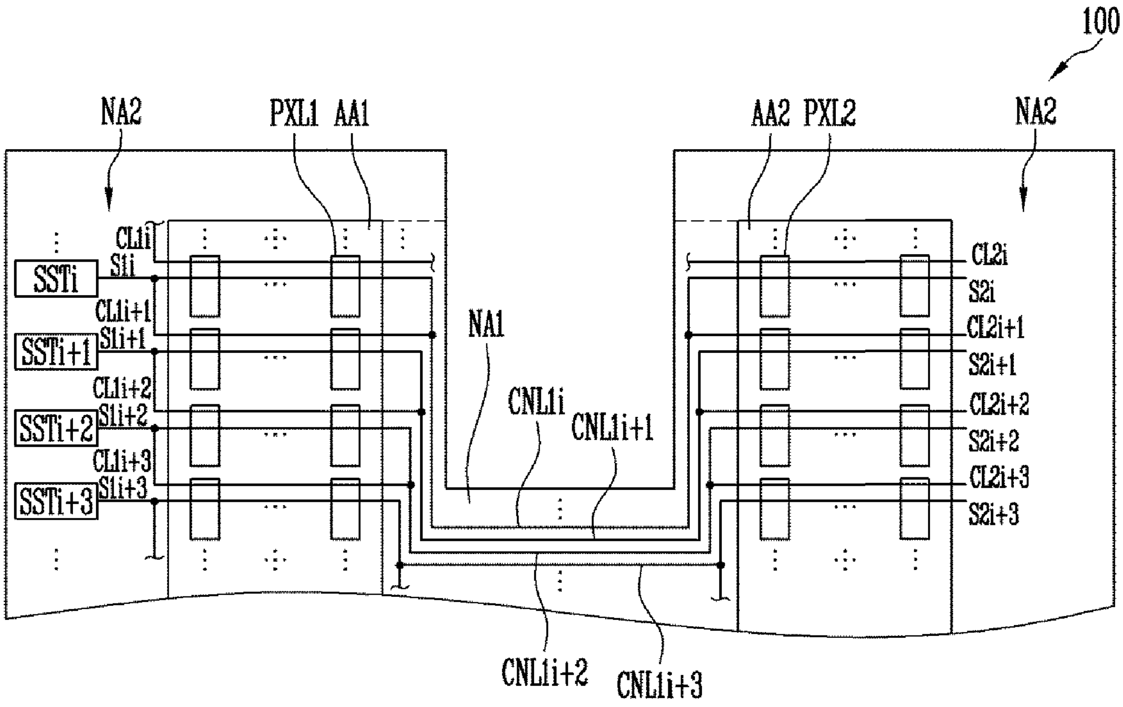
Figure 26:
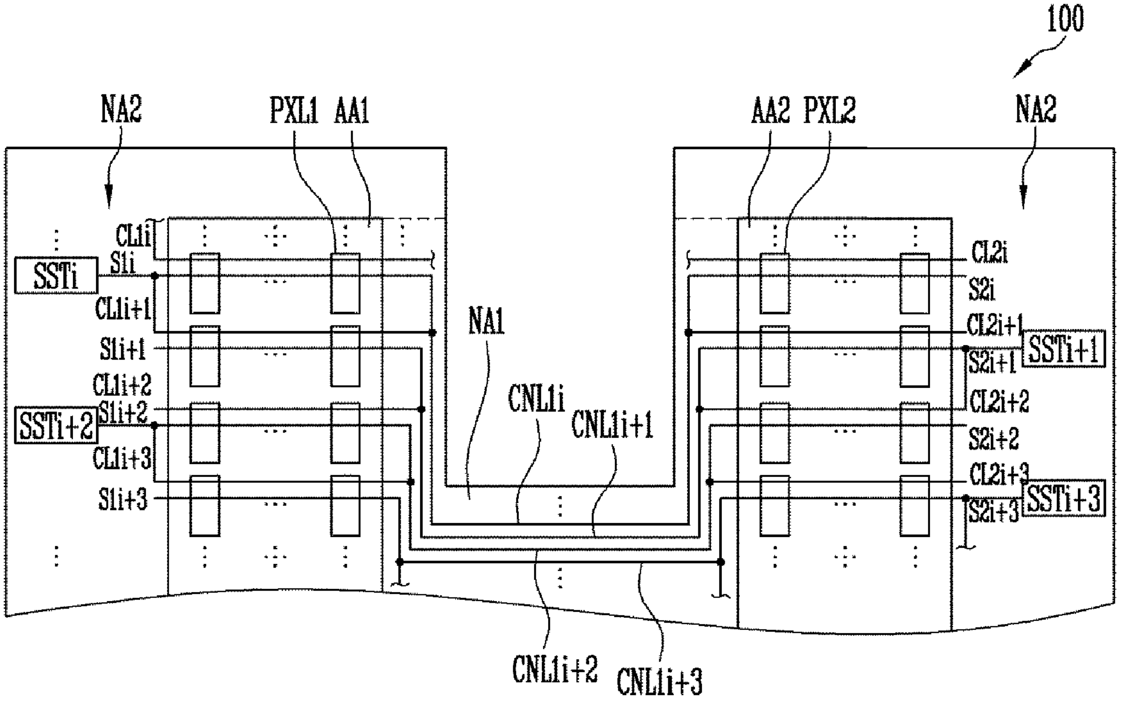

In addition, although only an exemplary embodiment in which the emission control lines simultaneously driven among the first and second emission control lines E1*i*, E1*i*+1, E1*i*+2, E1*i*+3, E2*i*, E2*i*+1, E2*i*+2, and E2*i*+3 are commonly coupled to one first coupling line (e.g., any one of CNL1*k* and CNL1*k*+1) is disclosed in FIGS. 23 and 24, it is to be understood that exemplary embodiments of the present disclosure are not limited thereto. For example, as shown in FIGS. 25 and 26, in exemplary embodiments, initialization control lines and scan lines, which are simultaneously driven among first and second initialization control lines CL1*i*, CL1*i*+1, CL1*i*+2, CL1*i*+3, CL2*i*, CL2*i*+1, CL2*i*+2, and CL2*i*+3 and first and second scan lines S1*i*, S1*i*+1, S1*i*+2, S1*i*+3, S2*i*, S2*i*+1, S2*i*+2, and S2*i*+3, may be commonly coupled to one first coupling line (e.g., any one of CNL1*i*, CNL1*i*+1, CNL1*i*+2, and CNL1*i*+3).

As an example, ith first and second scan lines S1*i* and S2*i* respectively disposed on ith horizontal lines of the first and second pixel regions AA1 and AA2, and (i+1)th first and second initialization control lines CL1*i*+1 and CL2*i*+1 respectively disposed on (i+1)th horizontal lines of the first and second pixel regions AA1 and AA2, may be commonly coupled to an ith coupling line CNL1*i* disposed in the first non-pixel region NA1. In addition, the ith first and second scan lines S1*i* and S2*i* and the (i+1)th first and second initialization control lines CL1*i*+1 and CL2*i*+1 may be commonly coupled to an ith scan stage SSTi provided in the scan driver 110, and thus, are simultaneously supplied with an ith scan signal (or an (i+1)th initialization control signal) from the ith scan stage SSTi.

In addition, (i+1)th first and second scan lines S1*i*+1 and S2*i*+1 respectively disposed on (i+1)th horizontal lines of the first and second pixel regions AA1 and AA2, and (i+2)th first and second initialization control lines CL1*i*+2 and CL2*i*+2 respectively disposed on (i+2)th horizontal lines of the first and second pixel regions AA1 and AA2, may be commonly coupled to an (i+1)th first coupling line CNL1*i*+1 disposed in the first non-pixel region NA1. The (i+1)th first and second scan lines S1*i*+1 and S2*i*+1 and the (i+2)th first and second initialization control lines CL1*i*+2 and CL2*i*+2 may be commonly coupled to an (i+1)th scan stage SSTi+1 provided in the scan driver 110, and thus, are simultaneously supplied with an (i+1)th scan signal (or an (i+2)th initialization control signal) from the (i+1)th scan stage SSTi+1.

In the above-described manner, the initialization control lines and the scan lines, which are simultaneously driven among the first and second initialization control lines CL1*i*, CL1*i*+1, CL1*i*+2, CL1*i*+3, CL2*i*, CL2*i*+1, CL2*i*+2, and CL2*i*+3 and the first and second scan lines S1*i*, S1*i*+1, S1*i*+2, S1*i*+3, S2*i*, S2*i*+1, S2*i*+2, and S2*i*+3, may be commonly coupled to one first coupling line (e.g., any one of CNLi, CNLi+1, CNLi+2, and CNLi+3) to be driven by the same scan stage (e.g., any one of SSTi, SSTi+1, SSTi+2, and SSTi+3). Accordingly, the number of first coupling lines CNL1 disposed in the first non-pixel region NA1 can be decreased as compared with the exemplary embodiments shown in FIGS. 21 and 22.

Additionally, the scan stages SSTi, SSTi+1, SSTi+2, and SSTi+3 provided in the scan driver 110 may be sequentially disposed at the same one side of the display region DA (e.g., one side of the first pixel region AA1 or the second pixel region AA2), as shown in FIG. 25. Alternatively, the scan stages SSTi, SSTi+1, SSTi+2, and SSTi+3 may be alternatively disposed at one side of the first pixel region AA1 and the second pixel region AA2, as shown in FIG. 26.

According to the exemplary embodiments shown in FIGS. 23 to 26, in exemplary embodiments, at least two first gate control lines and at least two second gate control lines from among the first and second gate control lines disposed in the first and second pixel regions AA1 and AA2, which are substantially simultaneously driven by substantially the same driving signal, are integrally coupled by one first coupling line (e.g., CNL1*k* or CNL1*i*) in the first non-pixel region NA1. According to the above-described exemplary embodiments, the first and second pixel regions AA1 and AA2 are driven by one scan driver 110 and/or one emission control driver 120. As a result, the area of the second non-pixel region NA2 can be reduced.

Further, according to the above-described exemplary embodiments, the first and second control lines applied with the same control signal are integrally coupled by one first coupling line in the first non-pixel region NA1. As a result, the number of first coupling lines CNL1*k*, CNL1*k*+1, CNL1*i*, CNLli+1, CNLli+2, and CNLli+3 disposed in the first non-pixel region NA1 can be decreased. As an example, when the exemplary embodiments of FIGS. 23 to 26 are utilized, the number of first coupling lines CNL1*k*, CNL1*k*+1, CNL1*i*, CNL1*i*+1, CNL1*i*+2, and CNL1*i*+3 can be decreased to about a half as compared with the exemplary embodiments shown in FIGS. 21 and 22.

Thus, according to the above-described exemplary embodiments, the line structure of the first non-pixel region NA1 can be simplified, and accordingly, the area of the first non-pixel region NA1 can be effectively decreased.

Figure 27:
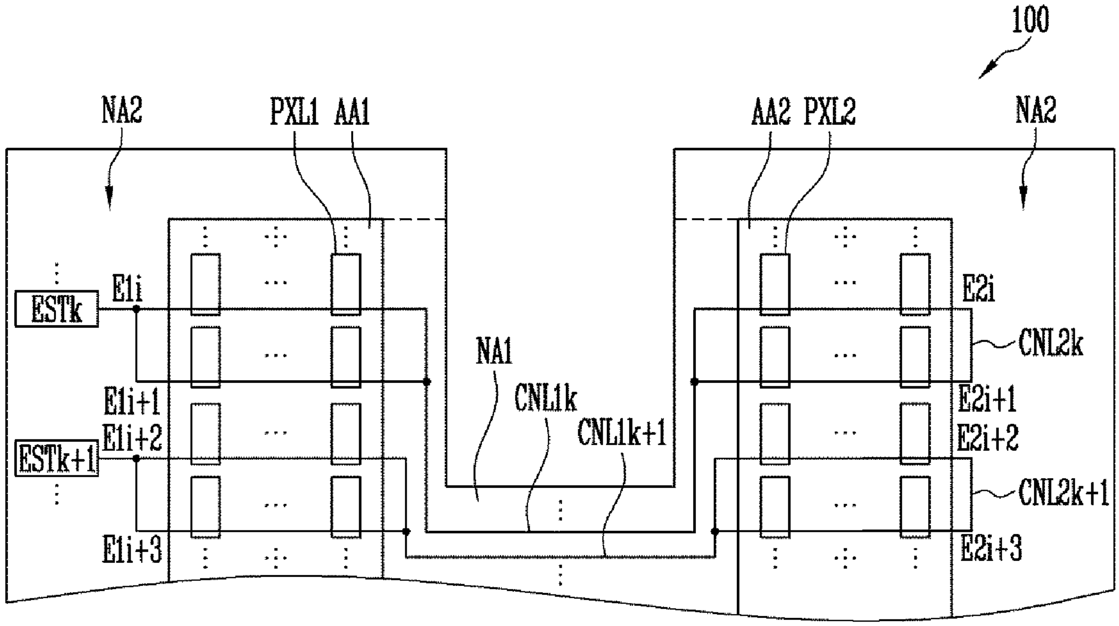
FIGS. 27 and 28 each illustrates one region of a display panel according to an exemplary embodiment of the present disclosure.
Figure 28:
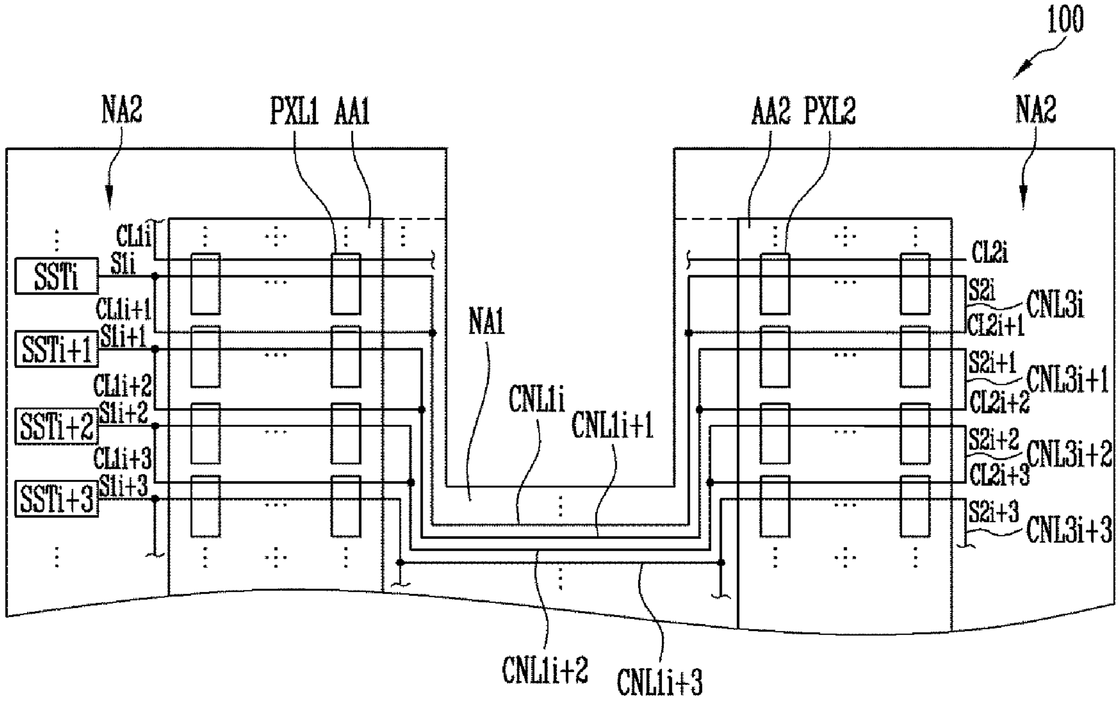

FIGS. 27 and 28 each illustrates one region of a display panel according to an exemplary embodiment of the present disclosure. In FIGS. 27 and 28, components similar or identical to those of the above-described exemplary embodiments are designated by like reference numerals, and for convenience of explanation, a further description of these components will be omitted.

First, referring to FIG. 27, a pair of first emission control lines E1*i* and E1*i*+1, or E1*i*+2 or E1*i*+3, may be coupled to each other at both sides of the first pixel region AA1. As an example, the pair of first emission control lines E1*i* and E1*i*+1, or E1*i*+2 and E1*i*+3, may be coupled to each other in the second non-pixel region NA2 at a left side of the first pixel region AA1 and the first non-pixel region NA1 at a right side of the first pixel region AA1.

In addition, a pair of second emission control lines E2*i* and E2*i*+1, or E2*i*+2 and E2*i*+3, may be coupled to each other at both sides of the second pixel region AA2. As an example, the pair of second emission control lines E2*i* and E2*i*+1, or E2*i*+2 and E2*i*+3, may be coupled to each other in the first non-pixel region NA1 at the left side of the second pixel region AA2 and the second non-pixel region NA2 at the right side of the second pixel region AA2.

To this end, the display panel 100 according to this exemplary embodiment further includes second coupling lines CNL2*k* and CNL2*k*+1, each disposed at one side of the first or second pixel region AA1 or AA2. For example, the display panel 100 may include a kth second coupling line CNL2*k* that couples the ith and (i+1)th first emission control lines E1*i* and E1*i*+1, or the ith and (i+1)th second emission control lines E2*i* and E2*i*+1, at one side of the first or second pixel region AA1 or AA2. As an example, the kth second coupling line CNL2*k* may be disposed at the opposite side of the kth emission control stage ESTk that supplies an emission control signal to emission control lines (e.g., the ith and (i+1)th first emission control lines E1*i* and E1*i*+1 and the ith and (i+1)th second emission control lines E2*i* and E2*i*+1) coupled thereto.

Next, referring to FIG. 28, in an exemplary embodiment, a first scan line and a first initialization control line, which are simultaneously driven by substantially the same signal from among the first scan lines S1*i*, S1*i*+1, S1*i*+2, and S1*i*+3 and the first initialization control lines CLli, CLli+1, CLli+2, and CLli+3, are coupled to each other at both sides of the first pixel region AA1. As an example, an ith first scan line S1*i* and an (i+1)th initialization control line CLli+1 may be coupled to each other in the second non-pixel region NA2 at the left side of the first pixel region AA1 and the first non-pixel region NA1 at the right side of the first pixel region AA1.

In addition, a second scan line and a second initialization control line, which are simultaneously driven by substantially the same signal from among the second scan lines S2*i*, S2*i*+1, S2*i*+2, and S2*i*+3 and the second initialization control lines CL2*i*, CL2*i*+1, CL2*i*+2, and CL2*i*+3, may be coupled to each other at both sides of the second pixel region AA2. As an example, an ith second scan line S2*i* and an (i+1)th second initialization control line CL2*i*+1 may be coupled to each other in the first non-pixel region NA1 at the left side of the second pixel region AA2 and the second non-pixel region NA2 at the right side of the second pixel region AA2.

To this end, the display panel 100 according to this exemplary embodiment further includes third coupling lines CNL3*i*, CNL3*i*+1, CNL3*i*+2, and CNL3*i*+3 each disposed at one side of the first or second pixel region AA1 and AA2. For example, the display panel 100 may include an ith third coupling line CNL3*i* that couples the ith first scan line S1*i* and the (i+1)th first initialization control line CL1*i*+1, or the ith second scan line S2*i* and the (i+1)th second initialization control line CL2*i*+1, at one side of the first or second pixel region AA1 or AA2. As an example, the ith third coupling line CNL3*i* may be disposed at the opposite side of the ith scan stage SSTi that supplies a scan signal (or initialization control signal) to scan lines and initialization control lines (e.g., the ith first and second scan lines S1*i* and S2*i* and the (i+1)th first and second initialization control lines CL1*i*+1 and CL2*i*+1) coupled thereto.

According to the exemplary embodiments shown in FIGS. 27 and 28, although at least one of the first coupling lines CNL1*k*, CNL1*k*+1, CNL1*i*, CNL1*i*+1, CNL1*i*+2, and CNL1*i*+3 may be broken in the first non-pixel region NA1 or in the vicinity thereof, the first and second gate control lines can be normally driven. Thus, according to the above-described exemplary embodiments, driving stability is ensured.

Figure 29:
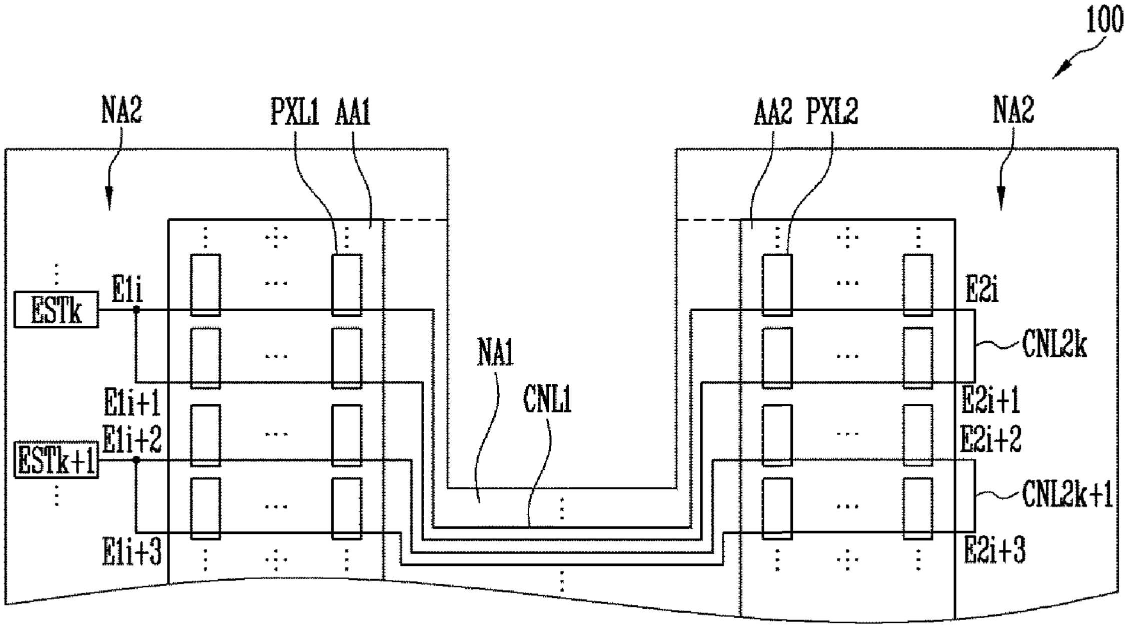
FIGS. 29 and 30 each illustrates one region of a display panel according to an exemplary embodiment of the present disclosure.
Figure 30:
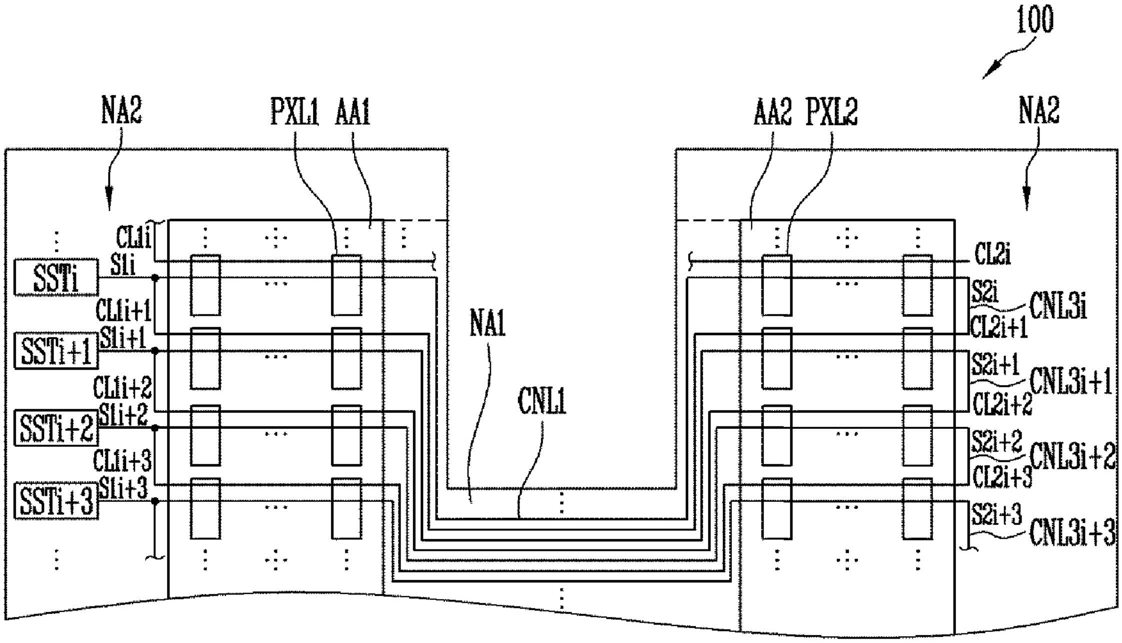

FIGS. 29 and 30 each illustrates one region of a display panel according to an exemplary embodiment of the present disclosure. In FIGS. 29 and 30, components similar or identical to those of the above-described exemplary embodiments are designated by like reference numerals, and a further detailed description thereof will be omitted.

Referring to FIGS. 29 and 30, similar to the exemplary embodiments shown in FIGS. 21 and 22, first and second gate control lines respectively disposed on the horizontal lines of the first and second pixel regions AA1 and AA2 are coupled to each other by each first coupling line. In addition, similar to the exemplary embodiments shown in FIGS. 27 and 28, second coupling lines CNL2*k* and CNL2*k*+1 and/or third coupling lines CNL3*i*, CNL3*i*+1, CNL3*i*+2, and CNL3*i*+3 are provided at one side of the first or second pixel region AA1 or AA2.

According to the above-described exemplary embodiments, the area occupied by a driving circuit in the display panel 100 is decreased, and accordingly, the area of the second non-pixel region NA2 can be reduced. Further, although at least one of the first coupling lines CNL1 in the first non-pixel region NA1 may be broken, the first and second gate control lines can be normally driven.

Figure 31:
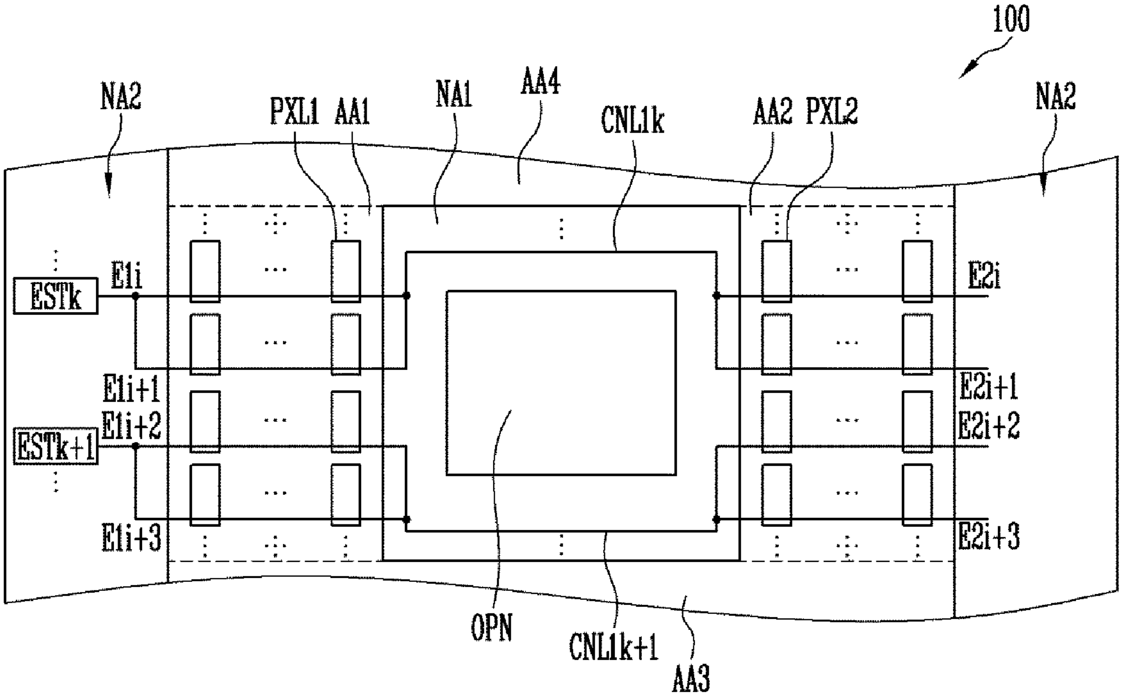
FIG. 31 illustrates one region of a display panel according to an exemplary embodiment of the present disclosure.

FIG. 31 illustrates one region of a display panel according to still another embodiment of the present disclosure. In FIG. 31, components similar or identical to those of the above-described embodiments are designated by like reference numerals, and their detailed descriptions will be omitted.

Referring to FIG. 31, similar to the exemplary embodiment shown in FIG. 12, in an exemplary embodiment, the display panel 100 includes an opening OPN disposed in the first non-pixel region NA1. In addition, the first coupling lines CNL1*k* and CNL1*k*+1 may be respectively disposed at upper and lower ends of the opening OPN in the first non-pixel region NA1. As an example, the kth first coupling line CNL1*k* may couple the ith and (i+1)th first emission control lines E1*i* and E1*i*+1 and the ith and (i+1)th second emission control lines E2*i* and E2*i*+1 via the first non-pixel region NA1 at the upper end of the opening OPN. In addition, the (k+1)th first coupling line CNL1*k*+1 may couple the (i+2)th and (i+3)th first emission control lines E1*i*+2 and E1*i*+3 and the (i+2)th and (i+3)th second emission control lines E2*i*+2 and E2*i*+3 via the first non-pixel region NA1 at the lower end of the opening OPN.

As described above, in the display according to exemplary embodiments of the present disclosure, the structure and/or shape of the display panel 100 can be variously modified and implemented.

According to exemplary embodiments of the present disclosure, a display device includes first and second pixel regions spaced apart from each other with a first non-pixel region interposed therebetween. As a result, the number of coupling lines disposed in the first non-pixel region is decreased in exemplary embodiments of the present disclosure. Accordingly, the line structure of the first non-pixel region can be simplified, and thus, the area of the first non-pixel region can be reduced.

While the present disclosure has been particularly shown and described with reference to the exemplary embodiments thereof, it will be understood by those of ordinary skill in the art that various changes in form and detail may be made therein without departing from the spirit and scope of the present disclosure as defined by the following claims.

What is claimed is:

1. A display device comprising a display area and a peripheral area outside the display area, comprising:

a first display area comprising a plurality of first pixels;

a second display area spaced apart from the first display area, wherein the second display area comprises a plurality of second pixels;

a first non-display area disposed between the first display area and the second display area;

a first signal line disposed in the first display area;

a second signal line disposed in the first display area;

a third signal line disposed in the second display area;

a fourth signal line disposed in the second display area;

a first connecting line disposed in the first non-display area, wherein the first connecting line commonly connects the first, second, third and fourth signal lines; and a driver disposed in the peripheral area, wherein the driver drives the first, second, third and fourth signal lines.

2. The display device of claim 1, wherein the driver is an emission control driver comprising a plurality of emission control stages.

3. The display device of claim 2, wherein the first signal line, the second signal line, the third signal line, the fourth signal line, and the first connecting line commonly receive an emission control signal from at least one emission control stage among the plurality of emission control stages.

4. The display device of claim 3, wherein the plurality of emission control stages are sequentially disposed at one side of the first display area.

5. The display device of claim 4, wherein the at least one emission control stage is connected to the first signal line and the second signal line.

6. The display device of claim 5, further comprising:

a second connecting line connecting the first signal line and the second signal line.

7. The display device of claim 3, wherein the plurality of emission control stages are alternately disposed at one side of the first display area and one side of the second display area.

8. The display device of claim 7, wherein the at least one emission control stage is connected to the first signal line and the second signal line.

9. The display device of claim 8, further comprising:

a second connecting line connecting the first signal line and the second signal line.

10. The display device of claim 1, wherein the driver is a scan driver comprising a plurality of scan stages.

11. The display device of claim 10, wherein the first signal line, the second signal line, the third signal line, the fourth signal line, and the first connecting line commonly receive a scan signal from at least one scan stage among the plurality of scan stages.

12. The display device of claim 11, wherein the plurality of scan stages are sequentially disposed at one side of the first display area.

13. The display device of claim 12, wherein the at least one scan stage is connected to the first signal line and the second signal line.

14. The display device of claim 13, further comprising:

a second connecting line connecting the first signal line and the second signal line.

15. The display device of claim 11, wherein the plurality of scan stages are alternately disposed at one side of the first display area and one side of the second display area.

16. The display device of claim 15, wherein the at least one scan stage is connected to the first signal line and the second signal line.

17. The display device of claim 16, further comprising:

a second connecting line connecting the first signal line and the second signal line.

18. A display device comprising a display area and a peripheral area outside the display area, comprising:

a first display area comprising a plurality of first pixels;

a second display area spaced apart from the first display area, wherein the second display area comprises a plurality of second pixels;

a first non-display area disposed between the first display area and the second display area;

a first signal line disposed in the first display area;

a second signal line disposed in the first display area;

a third signal line disposed in the second display area;

a fourth signal line disposed in the second display area;

a first connecting line disposed in the first non-display area, wherein the first connecting line commonly connects the first, second, third and fourth signal lines;

a second connecting line disposed at one side of the first display area, wherein the second connecting line connects the first signal line and the second signal line; and a driver disposed in the peripheral area, wherein the driver drives the first, second, third and fourth signal lines.

19. The display device of claim 18, wherein the driver is an emission control driver comprising a plurality of emission control stages.

20. The display device of claim 19, wherein the first signal line, the second signal line, the third signal line, the fourth signal line, the first connecting line, and the second connecting line commonly receive an emission control signal from at least one emission control stage among the plurality of emission control stages.

21. The display device of claim 20, wherein the at least one emission control stage is connected to the first signal line and the second signal line.

22. The display device of claim 18, wherein the driver is a scan driver comprising a plurality of scan stages.

23. The display device of claim 22, wherein the first signal line, the second signal line, the third signal line, the fourth signal line, the first connecting line, and the second connecting line commonly receive a scan signal from at least one scan stage among the plurality of scan stages.

24. The display device of claim 23, wherein the at least one scan stage is connected to the first signal line and the second signal line.

* * * * *